US011122488B1

(12) United States Patent
Lloyd et al.

(10) Patent No.: US 11,122,488 B1
(45) Date of Patent: Sep. 14, 2021

(54) SYSTEMS AND METHODS FOR PROVIDING A DYNAMIC COVERAGE HANDOVERS

(71) Applicant: Samsara Inc., San Francisco, CA (US)

(72) Inventors: Kevin Russell Coates Lloyd, San Carlos, CA (US); James Michael Rowson, Mamaroneck, NY (US); Aidan Siobhan Madigan-Curtis, San Francisco, CA (US); Gautam Ravi Ramaswamy, Monmouth Junction, NJ (US)

(73) Assignee: Samsara Inc., San Francisco, CA (US)

( * ) Notice: Subject to any disclaimer, the term of this patent is extended or adjusted under 35 U.S.C. 154(b) by 0 days.

(21) Appl. No.: 16/898,728

(22) Filed: Jun. 11, 2020

Related U.S. Application Data

(60) Provisional application No. 62/991,349, filed on Mar. 18, 2020.

(51) Int. Cl.

| | |
|---|---|
| ***H04W 4/00*** | (2018.01) |
| ***H04W 36/32*** | (2009.01) |
| ***H04W 88/16*** | (2009.01) |
| ***H04W 36/38*** | (2009.01) |
| ***H04W 4/021*** | (2018.01) |
| ***H04W 36/30*** | (2009.01) |

(52) U.S. Cl.
CPC ........... *H04W 36/32* (2013.01); *H04W 4/021* (2013.01); *H04W 36/30* (2013.01); *H04W 36/38* (2013.01); *H04W 88/16* (2013.01)

(58) Field of Classification Search
CPC ..... H04W 36/32; H04W 88/16; H04W 36/30; H04W 4/021; H04W 36/38
USPC .......................................................... 370/331
See application file for complete search history.

(56) References Cited

U.S. PATENT DOCUMENTS

| | | | | |
|---|---|---|---|---|
| 5,917,433 | A | 6/1999 | Keillor et al. | |
| 6,452,487 | B1 | 9/2002 | Krupinski | |
| 8,633,672 | B2 | 1/2014 | Jung et al. | |
| 8,730,870 | B2 * | 5/2014 | Walter | H04W 4/04 370/328 |
| 8,782,195 | B2 * | 7/2014 | Foti | H04W 4/70 709/223 |
| 9,024,744 | B2 | 5/2015 | Klose et al. | |
| 9,445,270 | B1 * | 9/2016 | Bicket | H04L 12/66 |
| 9,477,639 | B2 | 10/2016 | Fischer et al. | |
| 10,033,706 | B2 | 7/2018 | Bicket et al. | |
| 10,085,149 | B2 | 9/2018 | Bicket et al. | |
| 10,102,495 | B1 | 10/2018 | Zhang et al. | |
| 10,173,486 | B1 | 1/2019 | Lee et al. | |
| 10,173,544 | B2 | 1/2019 | Hendrix et al. | |

(Continued)

*Primary Examiner* — Amancio Gonzalez
(74) *Attorney, Agent, or Firm* — Knobbe, Martens, Olson & Bear, LLP

(57) ABSTRACT

A gateway device for providing a dynamic network activation and/or handover is disclosed herein. The gateway device may determine a first location of the gateway device and identify a first map tile from a network provider map. The gateway device may identify network desirability information associated with the first map tile and identify, based at least in part on the network desirability information, a first network provider. The gateway device may determine a second location and a second map tile from the network provider map. Based at least in part on network desirability information associated with the second map tile, the gateway device may perform or not perform a network activation and/or handover.

20 Claims, 8 Drawing Sheets

(56) References Cited

U.S. PATENT DOCUMENTS 10,196,071 B1 2/2019 Rowson et al.
10,206,107 B2 2/2019 Bicket et al.
10,390,227 B2 8/2019 Bicket et al.
10,579,123 B2 3/2020 Tuan et al.
10,609,114 B1 3/2020 Bicket et al.
10,623,899 B2 4/2020 Watkins et al.
10,827,324 B1 11/2020 Hajimiri et al.
10,843,659 B1 11/2020 Innocenzi et al.
2002/0061758 A1 5/2002 Zarlengo et al.
2005/0232189 A1* 10/2005 Loushine .............. H04W 64/00 370/328
2005/0286774 A1 12/2005 Porikli
2006/0167591 A1 7/2006 McNally
2008/0319602 A1 12/2008 McClellan et al.
2009/0240427 A1 9/2009 Siereveld et al.
2010/0049639 A1 2/2010 Ferro et al.
2011/0276265 A1 11/2011 Husain
2012/0201277 A1 8/2012 Tanner et al.
2012/0235625 A1 9/2012 Takehara
2012/0303397 A1 11/2012 Prosser
2013/0162421 A1 6/2013 Inaguma et al.
2013/0244210 A1 9/2013 Nath et al.
2014/0012492 A1 1/2014 Bowers et al.
2014/0095061 A1 4/2014 Hyde
2014/0098060 A1 4/2014 McQuade et al.
2014/0195106 A1 7/2014 McQuade et al.
2014/0278108 A1 9/2014 Kerrigan et al.
2014/0354227 A1 12/2014 Tyagi et al.
2014/0354228 A1 12/2014 Williams et al.
2015/0044641 A1 2/2015 Chauncey et al.
2015/0074091 A1 3/2015 Walkin et al.
2015/0226563 A1 8/2015 Cox et al.
2015/0283912 A1 10/2015 Shimizu et al.
2016/0275376 A1 9/2016 Kant
2016/0288744 A1 10/2016 Rutherford et al.
2016/0343091 A1 11/2016 Han et al.
2016/0375780 A1 12/2016 Penilla et al.
2017/0039784 A1 2/2017 Gelbart et al.
2017/0102463 A1 4/2017 Hwang
2017/0140603 A1 5/2017 Ricci
2017/0263049 A1 9/2017 MacDonald et al.
2017/0286838 A1 10/2017 Cipriani et al.
2017/0291611 A1 10/2017 Innes et al.
2017/0332199 A1 11/2017 Elliott et al.
2017/0345283 A1 11/2017 Kwon et al.
2017/0366935 A1 12/2017 Ahmadzadeh et al.
2018/0001771 A1 1/2018 Park et al.
2018/0012196 A1 1/2018 Ricci et al.
2018/0025636 A1 1/2018 Boykin et al.
2018/0063576 A1 3/2018 Tillman et al.
2018/0093672 A1 4/2018 Terwilliger et al.
2018/0262724 A1 9/2018 Ross
2019/0003848 A1 1/2019 Hoten et al.
2019/0118655 A1 4/2019 Grimes et al.
2019/0174158 A1 6/2019 Herrick et al.
2019/0244301 A1 8/2019 Seth et al.
2019/0286948 A1 9/2019 Sathyanarayana et al.
2019/0318419 A1 10/2019 VanderZanden
2019/0327590 A1 10/2019 Kubo et al.
2019/0327613 A1 10/2019 Bicket et al.
2020/0064435 A1* 2/2020 Douglas .................. H04W 4/38
2020/0074397 A1 3/2020 Burda et al.
2020/0139847 A1 5/2020 Baumer et al.
2020/0150739 A1 5/2020 Tuan et al.
2020/0162489 A1 5/2020 Bar-Nahum et al.
2020/0342230 A1 10/2020 Tsai et al.
2020/0342235 A1 10/2020 Tsai et al.
2020/0342274 A1 10/2020 ElHattab et al.
2020/0342506 A1 10/2020 Levy et al.
2020/0342611 A1 10/2020 ElHattab et al.
2020/0344301 A1 10/2020 ElHattab et al.
2020/0371773 A1 11/2020 Kato et al.
2020/0389415 A1 12/2020 Zhao et al.
2021/0006950 A1 1/2021 Hajimiri et al.

* cited by examiner

SYSTEMS AND METHODS FOR PROVIDING A DYNAMIC COVERAGE HANDOVERS

CROSS-REFERENCE TO RELATED APPLICATIONS

This application claims benefit of U.S. Provisional Patent Application No. 62/991,349, filed Mar. 18, 2020, and titled "SYSTEMS AND METHODS FOR PROVIDING A DYNAMIC COVERAGE HANDOVERS." The entire disclosure of each of the above items is hereby made part of this specification as if set forth fully herein and incorporated by reference for all purposes, for all that it contains.

Any and all applications for which a foreign or domestic priority claim is identified in the Application Data Sheet as filed with the present application are hereby incorporated by reference under 37 CFR 1.57 for all purposes and for all that they contain.

TECHNICAL FIELD

Embodiments of the present disclosure relate to gateway devices, sensors, systems, and methods that allow for generation of network coverage maps and assisting in dynamic network activation and/or handovers.

BACKGROUND

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

Fleet management devices may provide services such as location tracking, ELD compliance, routing and dispatch, wireless reporting and generating alerts, and the like.

SUMMARY

The systems, methods, and devices described herein each have several aspects, no single one of which is solely responsible for its desirable attributes. Without limiting the scope of this disclosure, several non-limiting features will now be described briefly.

For fleet management devices used to provide services such as location tracking, ELD compliance, routing and dispatch, wireless reporting and generating alerts, and the like, network connectivity is vital. However, when a device relies on a single wireless provider, network connectivity may not be reliable in certain areas. While currently available network handover systems and methods (e.g., roaming service) do provide a back-up wireless network provider when a primary wireless network provider is unavailable, such static network handover often fails to provide flexible, dynamic wireless network handover that can provide optimal network connectivity and efficiency depending on the location of a fleet management device.

Embodiments of the present disclosure relate to gateway devices, systems, and methods that allow for dynamic network activation and/or handovers. Embodiments of the present disclosure further relate to systems and methods that provide network provider maps to the gateway devices, systems, and methods. For example, according to various embodiments, the present disclosure includes one or more gateway device that include at least a location determination module for acquiring location information. The location data may be processed or analyzed by the gateway device to determine the location of the gateway device. The gateway device may further access a network provider map and determine a first map tile of the network provider map based at least in part on the location of the gateway devices. The gateway devices may further identify a first network provider and activate the gateway devices on the first network provider.

In various embodiments, the gateway devices may be configured to automatically connect to a remote management server and may access network provider maps, organization data, configurations data, and etc. via wired or wireless communications. The gateway devices may further communication with the management server and user computing devices to, for example, provide remote access to the gateway device.

In various embodiments, the gateway devices may include network subscription identifiers that allow the gateway devices to establish network communications with network providers.

In various embodiments, the gateway devices may access and analyze network desirability information associated with network providers to determine whether to perform network handovers. The network desirability information may be compared to a predetermined network desirability condition or threshold. The network desirability information may include network desirability index.

Further, according to various embodiments, the present disclosure includes one or more management servers that may receive an image of a geographical location. The management server may divide the image into a grid with map tiles and receive network desirability information associated with network providers associated with the gateway devices. The management server may further identify a first map tile of the network provider map and identifier a first network desirability information and a second network desirability information associated with the first map tile. The management server may further compare the first network desirability information and the second network desirability information and determine a network provider based at least in part on the comparison.

In various embodiments, the map tiles of the network provider map are rectangular, triangular, square, circular, hexagonal, and the like. The shapes of the map tiles may be regular or irregular.

In various embodiments, the management server may generate a unique map tile identifier for each of the map tiles.

In various embodiments, each of the map tiles may be have different patterns or colors based on its association with a network provider. For example, map tiles associated with different network providers may have different patterns, colors, or both.

Various combinations of the above and below recited features, embodiments, and aspects are also disclosed and contemplated by the present disclosure.

Additional embodiments of the disclosure are described below in reference to the appended claims, which may serve as an additional summary of the disclosure.

In various embodiments, systems and/or computer systems are disclosed that comprise a computer readable storage medium having program instructions embodied therewith, and one or more processors configured to execute the program instructions to cause the one or more processors to perform operations comprising one or more aspects of the above- and/or below-described embodiments (including one or more aspects of the appended claims).

In various embodiments, computer-implemented methods are disclosed in which, by one or more processors executing program instructions, one or more aspects of the above- and/or below-described embodiments (including one or more aspects of the appended claims) are implemented and/or performed.

In various embodiments, computer program products comprising a computer readable storage medium are disclosed, wherein the computer readable storage medium has program instructions embodied therewith, the program instructions executable by one or more processors to cause the one or more processors to perform operations comprising one or more aspects of the above- and/or below-described embodiments (including one or more aspects of the appended claims).

BRIEF DESCRIPTION OF THE DRAWINGS

The following drawings and the associated descriptions are provided to illustrate embodiments of the present disclosure and do not limit the scope of the claims. Aspects and many of the attendant advantages of this disclosure will become more readily appreciated as the same become better understood by reference to the following detailed description, when taken in conjunction with the accompanying drawings, wherein:

DETAILED DESCRIPTION

Figure 1:
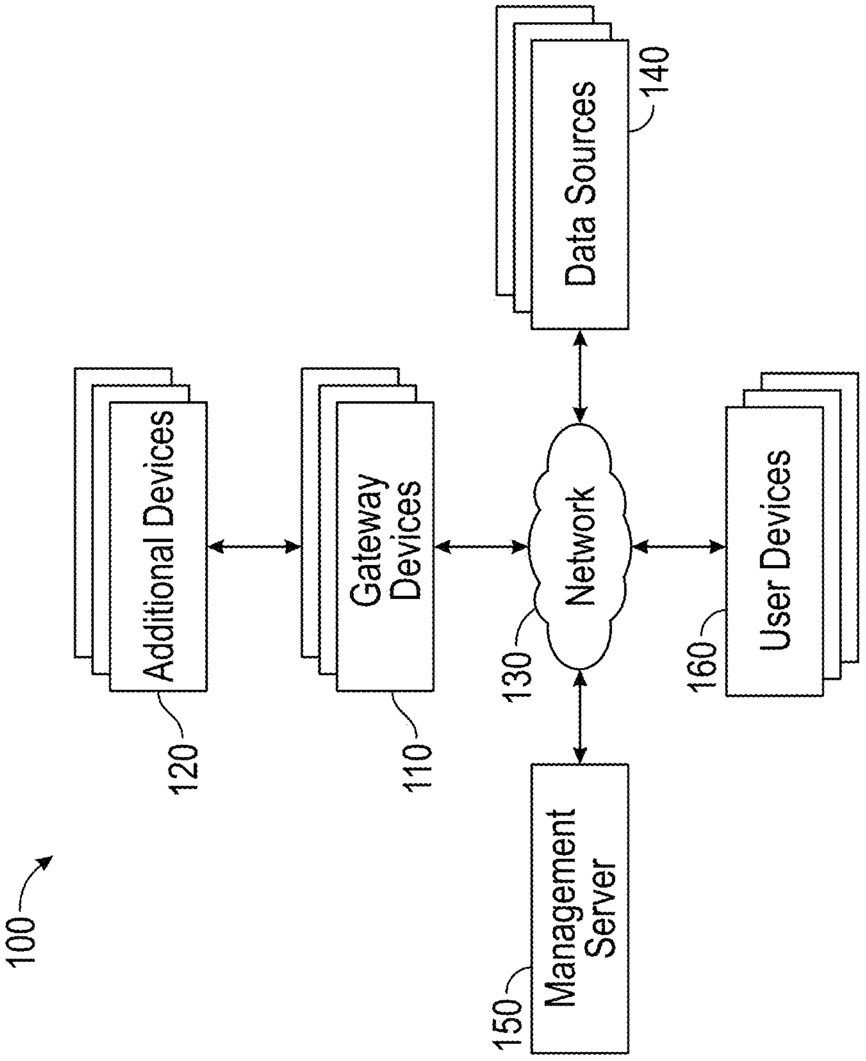
FIG. 1 illustrates a block diagram of an example operating environment 100 in which one or more aspects of the present disclosure may operate, according to various embodiments of the present disclosure.

Although certain preferred embodiments and examples are disclosed below, inventive subject matter extends beyond the specifically disclosed embodiments to other alternative embodiments and/or uses and to modifications and equivalents thereof. Thus, the scope of the claims appended hereto is not limited by any of the particular embodiments described below. For example, in any method or process disclosed herein, the acts or operations of the method or process may be performed in any suitable sequence and are not necessarily limited to any particular disclosed sequence. Various operations may be described as multiple discrete operations in turn, in a manner that may be helpful in understanding certain embodiments; however, the order of description should not be construed to imply that these operations are order dependent. Additionally, the structures, systems, and/or devices described herein may be embodied as integrated components or as separate components. For purposes of comparing various embodiments, certain aspects and advantages of these embodiments are described. Not necessarily all such aspects or advantages are achieved by any particular embodiment. Thus, for example, various embodiments may be carried out in a manner that achieves or optimizes one advantage or group of advantages as taught herein without necessarily achieving other aspects or advantages as may also be taught or suggested herein.

I. Overview

As mentioned above, according to various embodiments, the present disclosure includes one or more gateway devices that include at least a location determination module for generating location information associated with a gateway device. The location information may be analyzed by a remote computing system to, for example, determine location of the gateway device. The gateway device may include one or more network subscription identifiers, where each of the one or more network subscription identifiers is associated with a corresponding network provider. The gateway device may further include components for communicating with other devices/systems, including via one or more networks and/or one or more network providers.

In various embodiments, the gateway devices may be configured to automatically connect to a remote management server (for example, a "cloud"-based management server), and may transmit data associated with location of the gateway devices to the remote management server via wired or wireless communications. The gateway devices may further communicate with the management server or user computing devices, for example, to provide remote access to the gateway device, provide real-time information from the gateway device, receive configurations/updates, provide interactive graphical user interfaces, and the like.

In various embodiments, the management server may aggregate data associated with location and configuration from one or more gateway devices, and provide statuses, alerts, analyses, etc., including via interactive graphical user interfaces that may be accessed via user computing devices. The management server may provide interactive graphical user interfaces through which a user may configure one or more gateway devices.

Various aspects of the present disclosure may individually and/or collectively provide various technical advantages as described herein, and may overcome various disadvantages of prior systems and methods. For example, embodiments of the present disclosure may include gateway devices that include built-in wireless and/or wired communications capabilities. The gateway devices may automatically establish communication with a remote management server, user devices, data sources, and the like. The gateway devices may be remotely and centrally monitored and configured via the management server, for example, via a wired or wireless network. The gateway devices may include location determination module(s), user interface module(s), communication module(s), configurations database, network database, or server database that may operate autonomously based on a current configuration.

The gateway devices may transmit location information associated with the gateway devices to a remote database (for example, via the management server and the network). Such location information or configuration information may be useable by the management server for providing further analyses, insights, alerts, summaries, etc. to users via interactive graphical user interfaces. The gateway devices may provide remote access to live location information via a web-server operating on the gateway devices. Additional devices may communicate with the gateway devices via wired or wireless, direct or networked communications. The gateway devices may provide interactive graphical user interfaces to such additional devices, enabling synchronization of gateway device status at multiple additional devices and/or other user devices.

Advantageously, according to various embodiments, the present disclosure may provide a network handover system that provides dynamic network handover for gateway devices. The present disclosure may provide a system to generate and provide network provider maps to gateway devices.

Embodiments of the disclosure will now be described with reference to the accompanying figures, wherein like numerals refer to like elements throughout. The terminology used in the description presented herein is not intended to be interpreted in any limited or restrictive manner, simply because it is being utilized in conjunction with a detailed description of certain specific embodiments of the disclosure. Furthermore, embodiments of the disclosure may include several novel features, no single one of which is solely responsible for its desirable attributes or which is essential to practicing the embodiments of the disclosure herein described.

Terms

In order to facilitate an understanding of the systems and methods discussed herein, a number of terms are defined below. The terms defined below, as well as other terms used herein, should be construed broadly to include the provided definitions, the ordinary and customary meaning of the terms, and/or any other implied meaning for the respective terms. Thus, the definitions below do not limit the meaning of these terms, but only provide example definitions.

User Input (also referred to as "Input"): Any interaction, data, indication, etc., received by a system/device from a user, a representative of a user, an entity associated with a user, and/or any other entity. Inputs may include any interactions that are intended to be received and/or stored by the system/device; to cause the system/device to access and/or store data items; to cause the system to analyze, integrate, and/or otherwise use data items; to cause the system to update to data that is displayed; to cause the system to update a way that data is displayed; and/or the like. Non-limiting examples of user inputs include keyboard inputs, mouse inputs, digital pen inputs, voice inputs, finger touch inputs (for example, via touch sensitive display), gesture inputs (for example, hand movements, finger movements, arm movements, movements of any other appendage, and/or body movements), and/or the like. Additionally, user inputs to the system may include inputs via tools and/or other objects manipulated by the user. For example, the user may move an object, such as a tool, stylus, or wand, to provide inputs. Further, user inputs may include motion, position, rotation, angle, alignment, orientation, configuration (for example, fist, hand flat, one finger extended, etc.), and/or the like. For example, user inputs may comprise a position, orientation, and/or motion of a hand or other appendage, a body, a 3D mouse, and/or the like.

Data Store: Any computer readable storage medium and/or device (or collection of data storage mediums and/or devices). Examples of data stores include, but are not limited to, optical disks (for example, CD-ROM, DVD-ROM, etc.), magnetic disks (for example, hard disks, floppy disks, etc.), memory circuits (for example, solid state drives, random-access memory (RAM), etc.), and/or the like. Another example of a data store is a hosted storage environment that includes a collection of physical data storage devices that may be remotely accessible and may be rapidly provisioned as needed (commonly referred to as "cloud" storage).

Database: Any data structure (and/or combinations of multiple data structures) for storing and/or organizing data, including, but not limited to, relational databases (for example, Oracle databases, PostgreSQL databases, etc.), non-relational databases (for example, NoSQL databases, etc.), in-memory databases, spreadsheets, comma separated values (CSV) files, eXtendible markup language (XML) files, TeXT (TXT) files, flat files, spreadsheet files, and/or any other widely used or proprietary format for data storage. Databases are typically stored in one or more data stores. Accordingly, each database referred to herein (for example, in the description herein and/or the figures of the present application) is to be understood as being stored in one or more data stores. Additionally, although the present disclosure may show or describe data as being stored in combined or separate databases, in various embodiments such data may be combined and/or separated in any appropriate way into one or more databases, one or more tables of one or more databases, etc. As used herein, a data source may refer to a table in a relational database, for example.

Example Operating Environment

FIG. 1 illustrates a block diagram of an example operating environment 100 in which one or more aspects of the present disclosure may operate, according to various embodiments of the present disclosure. The operating environment 100 may include one or more user devices 160, a management server 150, one or more gateway devices 110, one or more data sources 140, and one or more additional devices 120. The various devices may communicate with one another via, for example, one or more networks 130, as illustrated.

In general, the gateway device 110 comprises a housing including processor(s), memory, data input/output (I/O) interface(s), communication module(s), location determination module(s), controller(s), and etc. For example, the gateway device 110 may be installed to or positioned inside a moving vehicle. The gateway device 110 may determine location information associated with the gateway device, determine a current configuration information associated with the gateway device, and transmit the location information and configuration information to the management server based at least in part on the current configuration of the gateway device 110.

Configurations of the gateway device 110 may include default network information, location determination frequency, organization preference information, and the like, as described herein.

The default network information, the location information, the configuration information, and other types of information associated with the gateway device 110 may be stored in a memory of the gateway device 110 (for example, a computer readable storage medium). In some embodiments, such data may be automatically transmitted intermittently or continuously from the gateway device 110 to the management server 150. The management server 150 may thereby receive location information and configuration information from multiple gateway devices 110, and may aggregate and perform further analyses on the location information and configuration information from multiple gateway devices 110.

The management server 150 may communicate with the gateway device(s) 110 to enable remote, rapid configuration of the gateway device(s) 110. Such configuration may be accomplished via interactive graphical user interfaces provided by the management server 150. In some embodiments, such interactive graphical user interfaces may be accessible by the user device(s) 160. Via the management server 150, and/or directly by communication with the gateway device(s) 110, user device(s) 160 may access real-time views of status, location information analysis, configuration information analysis, and the like of the gateway device(s) 110. Communications with the gateway device(s) 110 may be accomplished via web-servers executing on the gateway devices 110 themselves.

In some embodiments, the management server 150 may have access to network subscription information associated with network providers. The network subscription information may include pricing information, subscription term information, and the like. Based at least in part on the network subscription information, the management server 150 may automatically determine appropriate configuration for the gateway device(s) 110. For example, by comparing network subscription information associated with network providers, the management server 150 may identify a default network provider and network activation and handover schemes.

In general, the data sources 140 may be any type of database or server that can collect and store various types of information, for example, network availability information, network drop information, data transmissibility information, data transfer speed information, network connectivity information, and the like. The data sources 140 may be remote from the management server 150 and may have communication capabilities to wireless communication with the management server 150, for example, via the network 130.

The additional device(s) 120 may include sensors, programmable logic controllers (PLCs), and other devices that may be capable of generating and providing the gateway devices 110 real-time or delayed visibility via alerts, notifications, and data associated with assets associated with the gateway device 110. For example, the asset may be a trailer transported by a vehicle. In this regard, the additional devices 120 get collect and generate information related to the trailer and such information may include, but not limited to, temperature of the trailer, pressure inside the trailer, video feedback of the trailer, trailer door operation, and the like.

In general, the user devices 160 can be any computing device such as a desktop, laptop or tablet computer, personal computer, tablet computer, wearable computer, server, personal digital assistant (PDA), hybrid PDA/mobile phone, mobile phone, smartphone, set top box, voice command device, digital media player, and the like. A user device 160 may execute an application (for example, a browser, a stand-alone application, etc.) that allows a user to access interactive user interfaces, view images, analyses, or aggregated data, and/or the like as described herein. In various embodiments, users may interact with various components of the example operating environment 100 (for example, the management server 150, the gateway device(s) 110, the additional device(s) 120, etc.) via the user device(s) 160. Such interactions may typically be accomplished via interactive graphical user interfaces, however alternatively such interactions may be accomplished via command line, and/or other means.

The network 130 may include any wired network, wireless network, or combination thereof. For example, the network 130 may be a personal area network, local area network, wide area network, over-the-air broadcast network (for example, for radio or television), cable network, satellite network, cellular telephone network, or combination thereof. As a further example, the network 130 may be a publicly accessible network of linked networks, possibly operated by various distinct parties, such as the Internet. In some embodiments, the network 130 may be a private or semi-private network, such as a corporate or shared intranet. The network 130 may include one or more wireless networks, such as a Global System for Mobile Communications (GSM) network, a Code Division Multiple Access (CDMA) network, a Long Term Evolution (LTE) network, or any other type of wireless network. The network 130 can use protocols and components for communicating via the Internet or any of the other aforementioned types of networks. For example, the protocols used by the network 130 may include Hypertext Transfer Protocol (HTTP), HTTP Secure (HTTPS), Message Queue Telemetry Transport (MQTT), Constrained Application Protocol (CoAP), and the like. Protocols and components for communicating via the Internet or any of the other aforementioned types of communication networks are well known to those skilled in the art and, thus, are not described in more detail herein.

In some embodiments, the network 130 may include an external network, a local network, or both. The local network can be local to a particular organization (for example, a private or semi-private network), such as a corporate or shared intranet. In some implementations, devices may communicate via the local network without traversing the external network such as the Internet. In some implementations, devices connected via the local network may be walled off from accessing the external network (for example, the Internet), for example, by a gateway device, unless specifically granted access to the external network. Accordingly, for example, the user device(s) 160 may communicate with the gateway device 110 directly (via wired or wireless communications) or via the local network, without traversing the external network. Thus, even if the external network is down, or is not currently providing connectivity to the management server 150, the gateway device(s) 110, and the user device(s) 160 may continue to communicate and function via the local network (or via direct communications).

As described herein, the gateway devices 110 may be capable of, or configured to, communicate via multiple networks 130. Accordingly, while the diagram of FIG. 1 include a representation of a single network, it is to be understood that the network 130 may include multiple networks 130, each of which may be operated by different network providers, and which may utilize different communications technologies, protocols, bands, etc.

In various embodiments, communications among the various components of the example operating environment 100 may be accomplished via any suitable means. For example, the gateway device(s) 110 may communicate with one another, the additional device(s) 120, the data sources 140, the management server 150, and/or the user device(s) 160 via any combination of the network 130 and any other wired or wireless communications means or method (for example, Bluetooth, WiFi, infrared, cellular, etc.).

Further details and examples regarding the implementations, operation, and functionality, including various interactive graphical user interfaces, of the various components of the example operating environment 100 are described herein in reference to various figures.

Example Management Device/Server

Figure 2:
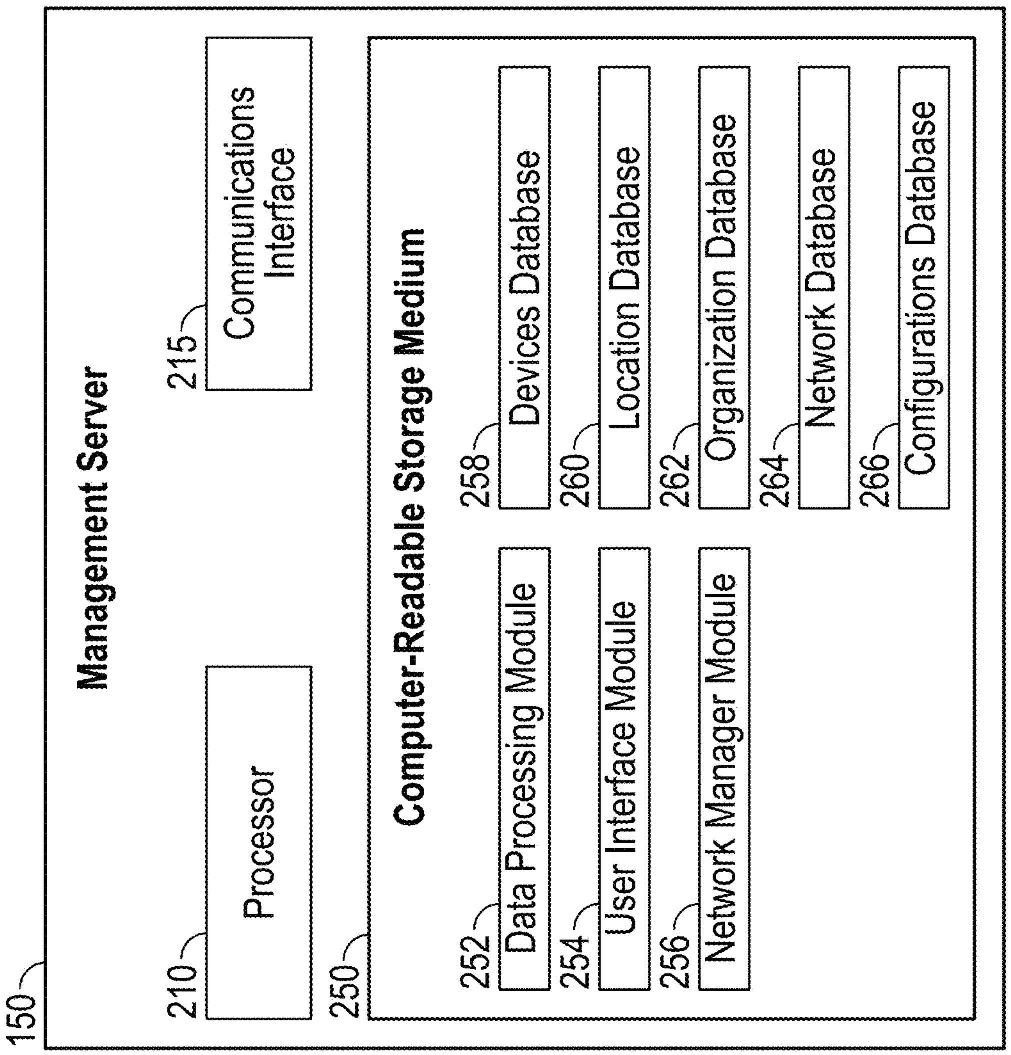
FIG. 2 illustrates a block diagram including an example implementation of a management server, according to various embodiments of the present disclosure.

FIG. 2 illustrates a block diagram including an example implementation of a management server 150, according to various embodiments of the present disclosure. The management server 150 may be a Web or cloud server, or a cluster of servers, running on one or more sets of server hardware. In an embodiment, the management server 150 may work for multiple organizations with different administrators that may have, for example, multiple gateway devices and additional devices.

According to various embodiments, management server 150 may include one or more communication interfaces 215, one or more processors 210, and one or more computer readable storage mediums 250, each of which may be in communication with one another. The computer readable storage medium 250 includes data processing module 252, user interface module 254, network manager module 256, devices database 258, location database 260, organizations database 262, network database 264, and configuration database 266. In various implementations, the various databases of the management server 150 may be combined or separated/partitioned as appropriate to implement the functionality described herein, and to maintain security and separation of data, for example, for different organizations. In various implementations, the various databases may or may not be stored separately from the management server 150.

In various implementations one or more interfaces, APIs, communication layers, buses, interconnects, wires/cables, etc. may be used to interconnect the various components of the management server 150.

In operation, the one or more communication interfaces 215, one or more processors 210, and one or more computer readable storage mediums 250 communicate with one another to, for example, execute by the processor(s) 210 computer program instructions (for example, as provided by the user interface module 254); receive, access, and transmit data (for example, to/from the databases and via the communication interface(s) 215); and/or the like. In general, the processor 210, the communication interface 215, and the computer readable storage medium 250 enable the functionality of the management server 150 as described herein. Further implementation details are described below.

In operation, the communication interface(s) 215 may provide wired and/or wireless communications with other devices and networks, as described herein. In various embodiments, communications among the various components of the example operating environment 100 may be accomplished via any suitable means. For example, the management server 150 may communicate with the gateway device 110, the data source(s) 140, the additional device(s) 120, and/or the user device(s) 160 via any combination of the network 130 or any other communications means or method (for example, Bluetooth, WiFi, infrared, cellular, etc.). Accordingly, the communications interface(s) 215 may include one or more of wired and wireless transceivers, such as a Joint Test Action Group (JTAG) transceiver, a Bluetooth or Bluetooth Low Energy (LE) transceiver, an IEEE 802.11 transceiver, an Ethernet transceiver, a USB transceiver, a Thunderbolt transceiver, an infrared transceiver, a wireless cellular telephony transceiver (for example, 2G, 3G, 4G, 5G), or the like.

In operation, data processing module 252 may provide processing and analysis of data (for example, data received from the various devices, including the gateway devices) as described herein. The data processing/analysis may usefully provide insights and information that may be provided via various interactive graphical user interfaces, as described herein.

In operation, the user interface module 254 may provide the various interactive graphical user interface functionality described herein. This may include, for example, generating user interface data useable for rendering the various interactive user interfaces described. The user interface data may be used by various computer systems, devices, and/or software programs (for example, a browser program of a user device 160), to render the interactive user interfaces. The interactive user interfaces may be displayed on, for example, electronic displays (including, for example, touch-enabled displays). For example, the user interface module 254 may provide various network accessible interactive graphical user interfaces, for example, to allow the administrators of the various organizations and devices to create and log into an account associated with an organization to which a set of devices belong (for example, gateway devices and additional devices), and manage, and access data associated with, those devices as described herein.

In operation, the network manager module 256 may provide communication with and configuration and management of the various devices associated with each organization. This may include, for example, receiving and managing information related to the various devices (for example, gateway devices and additional devices) at the time of manufacture, associating devices with particular organizations when they are purchased/claimed and implemented by the organizations (for example, the claiming may be performed at least in part by populating the devices database 258 and the organizations database 262 with appropriate information when the devices are associated with an organization), receiving data from the various devices (for example, and storing the data in the devices database 260 or other appropriate database), sending data to various devices (for example, sending and/or syncing configurations stored in the configurations database 266 to/with various devices), and/or the like.

In operation, the devices database 258 may store information regarding the gateway devices 110 and/or additional devices 120, and various relationships and associations among these devices. This information may include identifiers associated with these devices, location data received from these devices, network preference data from these devices, and etc.

In operation, the locations database 260 can include map information and location information. The map information can be associated with different geographical area and may further be linked with network information stored within the network database 264. The location information may be associated with various locations associated with the gateway devices 110. For example, the location information can include longitudinal and latitudinal information associated with the gateway devices 110. In some embodiments, the location information can be associated the location of the gateway devices 110 within a map tile of a grid.

In operation, the organizations database 262 may store information regarding the organizations to which the gateway devices 110 or additional devices 120 belong. In various embodiments, different configurations from the configurations database 266 may be applied for the gateway devices 110 or the additional devices 120 based at least in part on the organization the gateway devices 110 or additional devices 120 belong.

In operation, the network database 264 may store network information related to one or more network service providers and the network provided by those network service providers. The network information may include, but not limited to, data transmissibility, data transmission speed, signal strength, signal availability, signal to noise ratio, or number of dropped calls or disconnected wireless communications associated with each of the network service providers associated with the gateway device 110. The management server 150 may receive the network information stored in the network database 264 from the data sources 140, the gateway devices 110, the user devices 160, or any other remote data servers that may collect, store, or process network provider related information.

In various embodiments, the network information stored in the network database 264 may include network desirability information. The network desirability information may include at least one of, or any combination of the network information as described herein. As described herein, the gateway device 110 can be associated with one or more network service providers, wherein each of the one or more network service providers has corresponding network desirability information. In some embodiments, the network desirability information for a given network service provider may vary based at least in part on the location of the gateway device 110. In some embodiments, the network desirability information may be include a network desirability index. The network desirability index may represent the overall desirability of a network provider. The network desirability index may be a number that vary between 0 and 1. Alternatively, the network desirability index may vary between 0 and 100.

In operation, the network information stored in the network database 264 may be linked with the location information stored in the locations database 260, as described herein. The network information and the location information may be combined to create a network provider map. The network provider map may indicate which areas of the map may be associated with which network provider associated with the gateway device 110. Based on the information provided by the network provider map, the gateway device 110 may perform dynamic network handovers as described herein. In some embodiments, the network provider maps may be stored within the network database 264, or in any other modules or databases of the management server 150.

In operation, the configurations database 266 may store information regarding configurations of the gateway devices 110 or the additional devices 120. The information stored in the configuration database 266 may configuration information specific to certain gateway devices 110 or certain organizations associated with the gateway devices 110.

In various embodiments, the management server 150 may include various other modules, components, engines, etc. to provide the functionality as described herein. It will be appreciated that additional components, not shown, may also be part of the management server 150 and, in certain embodiments, fewer components than that shown in FIG. 2 may also be used in the management server 150. For example, the management server 150 may include a security module used to manage cryptographic keys, certificates, and/or other data associated with establishing secure communication with various other devices. For example, the devices database 260 may include an identifier of each device (for example, a serial number), a secret to be used to establish a secure communication with the devices of the same organization, and/or a mechanism to authenticate the devices' identity (for example, the public key of a private public key pair, the private key of which was embedded or stored in the device during the manufacturing, etc.).

Example Gateway Device

Figure 3:
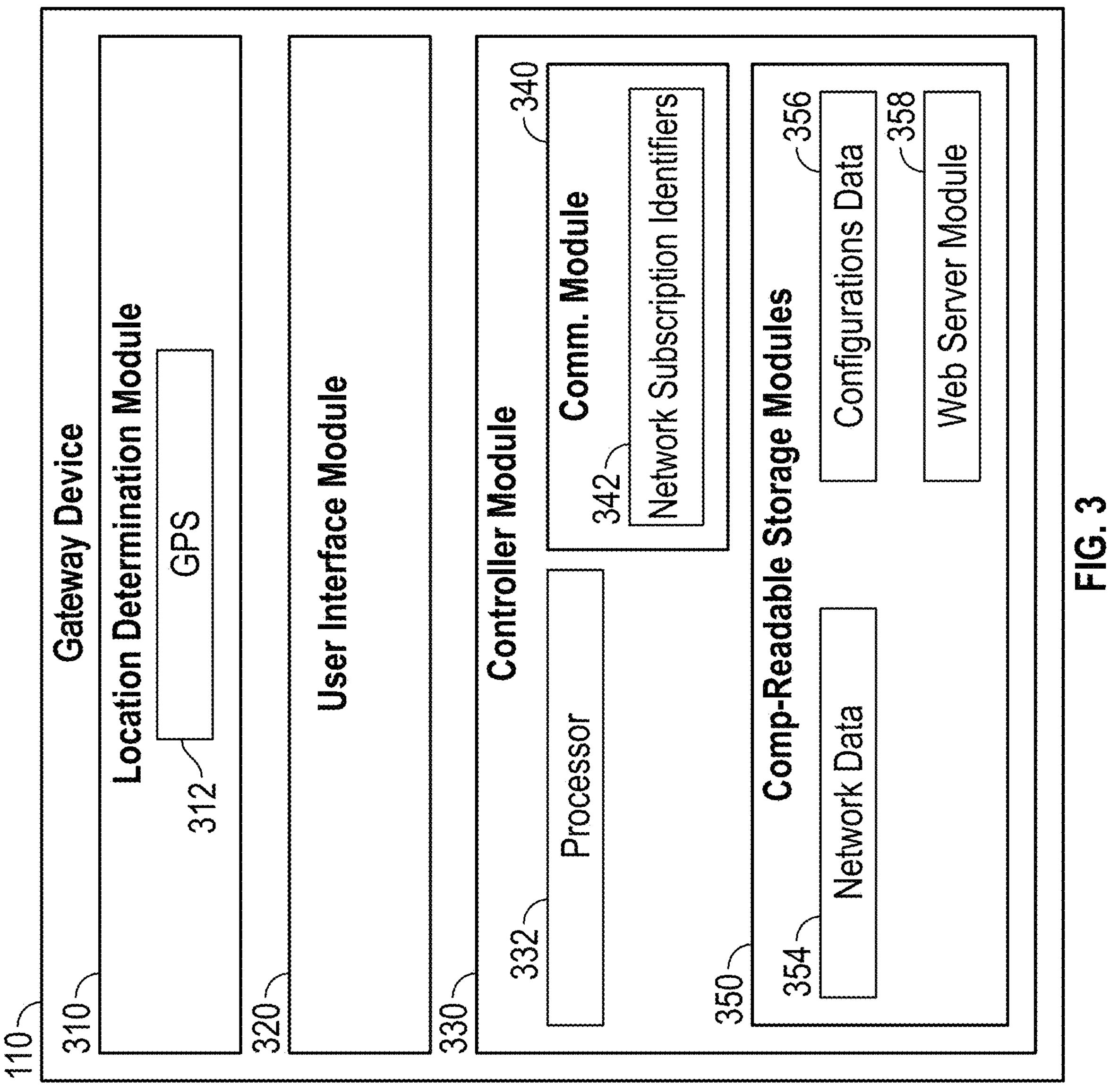
FIG. 3 illustrates a block diagram of an example gateway devices, according to various embodiments of the present disclosure.

FIG. 3 illustrates a block diagram of an example gateway device 110, according to various embodiments of the present disclosure. A gateway device 110 may comprise one or more location determination modules 310, one or more user interface modules 320, and one or more controller modules 330. In various implementations, the location determination modules 310, the user interface module 320, and the controller module 330 may be housed in different housings, and/or may be housed in a same housing. In various implementations, the various components and functionality of the gateway device 110 (including the components and functionality of the location determination modules 310, the under interface module 320, and the controller module 330) described herein may be combined, separated, and/or reorganized.

The location determination module 310 may include one or more location determination devices 312 (e.g., global positioning system (GPS) devices, GLONASS devices, and/or the like). In some embodiments, the location determination devices 312 may determine location of the gateway device 110 using various methods including, but not limited to, Wi-Fi, Bluetooth, Internet Protocol (IP) look up, and proximity to beacons (for example, other location determination devices 312). The location determination device(s) 312 may determine location of the gateway device 110 and generate location information associated with the location of the gateway device 110. The location information may include geographical positioning information (e.g., GPS coordinates, latitudinal or longitudinal data, and/or the like) that may represent the location of the gateway device 110. Additionally or alternatively, the location information may identify a map tile within a grid for identifying or estimating the location of the gateway device 110.

The user interface module 320 may generate various graphical user interfaces that can be displayed on other devices, for example, the user devices 160. The graphical interfaces may be transmitted, for example, to the user devices 160 via the network 130. The graphical user interfaces may be interactive. The graphical user interfaces may be able to detect user inputs and such user inputs may be transmitted to the gateway device 110 via the network 130 and the user interface module 320. The user interface module 320 may furthermore, for example, generate user interface data useable for rendering the various interactive user interfaces.

The controller module 330 may include one or more processors 332, one or more communication modules 340, and one or more computer readable storage mediums 350, each of which may be in communication with one another. The computer readable storage medium(s) 350 may include network data 354, configurations data 356 and web server module 358. The configurations data 356 and the web server module(s) 358 may be stored in one or more databases of the controller module 330, or may be stored on virtualization mediums in the cloud. The communication module 340 may include one or more transceivers and one or more network subscription identifiers (e.g., subscriber identification modules (SIMs)), wherein each of the one or more network subscription identifiers is associated with a network provider. In various implementations one or more buses, interconnects, wires/cables, etc. may be used to interconnect the various components of the controller module 330, and of the gateway device 110 more generally.

In operation, the one or more of the communication modules 340, one or more processors 332, and one or more computer readable storage mediums 350 communicate with one another to, for example, execute by the processor(s) 332 computer program instructions (for example, as provided by the configurations data 356); receive, access, and transmit data (for example, to/from the configurations data 356 or network data 354, via the communication module(s) 340); and/or the like. In general, the controller module 330, in connection with the location determination module 310 and the user interface module 320, enables the functionality of the gateway device 110 as described herein. Further implementation details are described below.

In operation, the communication module(s) 340 may provide wired and/or wireless communications with other devices and networks, as described herein. In various embodiments, communications among the various components of the example operating environment 100 may be accomplished via any suitable means. For example, the gateway device(s) 110 may communicate with one another, the additional device(s) 120, the management server 150, and/or the user device(s) 160 via the network 130 or any other communications means or method (for example, Bluetooth, WiFi, infrared, cellular, etc.). Accordingly, the communication module(s) 340 may include one or more of wired and wireless transceivers, such as a Joint Test Action Group (JTAG) transceiver, a Bluetooth or Bluetooth Low Energy (LE) transceiver, an IEEE 802.11 transceiver, an Ethernet transceiver, a USB transceiver, a Thunderbolt transceiver, an infrared transceiver, a wireless cellular telephony transceiver (for example, 2G, 3G, 4G, 5G) configured with one or more radios for communicating on various cellular networks (e.g., GSM, CDMA, LTE, EDGE, and/or the like), or the like. As noted herein, the communications interface(s) 324 may further include one or more application programming interfaces ("APIs").

In operation, the network data 354 may include, for example, association between the network subscription identifiers 342 to the network providers, network communication settings, router configurations, firewall settings, network sharing settings, IP address settings, user authentication settings, network traffic settings, and the like. The network data 354, together with the configuration data 356, may control and facilitate network connectivity of the gateway device 110 with the network 130, the management server 150, the user device(s) 160, and the additional device(s) 120.

In operation, the configuration data 356 includes one or more configurations that configure operation of the gateway device 110, as described herein. For example, such configurations may be received from a user via the user device(s) 160 or the management server 150 (other devices in communication with the gateway device 110). Each of the configurations stored in the configuration data 356 may include network preference information, location determination frequency, network connectivity information, and the like. The gateway device 110 may store multiple configurations in the configuration data 356, which may be selectively run or implemented, for example, via user selection via the management server 150 or the user device(s) 160.

In various embodiments, the configurations of the gateway device 110 may include default network settings. For example, the default network settings may indicate which network provider is to be used for the gateway device 110 to establish network communications. The default network settings may be based at least in part on network preference associated with an organization associated with the gateway device 110, cost information associated with network providers associated with the gateway device 110, or any other information associated with the network providers and the organization associated with the gateway device 110.

In operation, the web server module(s) 358 may include program code executable, for example, by the processor(s) 332 to provide a web-based access (for example, interactive graphical user interfaces accessible via web-based communications protocols, rendering of interactive graphical user interfaces written in web-based languages by web-based browsers, etc.) to the gateway device 110, for example, to configure the gateway device 110 and/or access data of the gateway device 110. Such web-based access may be via one or more communications protocols, for example, TCP/IP, UDP, WebRTC, etc., and may include one or more secure communications/cryptographic protocols, for example, TLS, SSL, etc., and may further be provided via communications module(s) 340. This may include, for example, generating user interface data useable for rendering the various interactive user interfaces described. The user interface data may be used by various computer systems, devices, and/or software programs (for example, a browser program of a user device 160), to render the interactive user interfaces. The interactive user interfaces may be displayed on, for example, electronic displays (including, for example, touch-enabled displays). In various implementations one or more of the management server 150 and the user device(s) 160 may communicate with the gateway device 110 via one or more of the web server module(s) 358.

The location information, the network data, or the configuration data may be communicated, for example, via the communications module(s) 340, to other devices, such as the management server 150 or user device(s) 160. For example, the gateway device 110 may be configured to reliably and securely transmit data to the management server 150 regardless of whether the connectivity of the gateway device 110 (for example, to the management server 150) is intermittent. For example, data may be stored by the gateway device 110 until connectivity is available, and may then by transmitted to the management server 150. In another example, data may be stored by the gateway device 110 for a predetermined duration, and may then be transmitted to the management server 150.

In various implementations, as described above, the gateway device(s) 110 may communicate with one or more additional devices 120, which may include, for example, sensors or programmable logic controller (PLC) capable of generating and providing real-time or delayed alerts, notifications, data, for example, related to assets associated with the gateway device(s) 110. Communications with additional device(s) 120 may be via direct (for example, not via a network) wired and/or wireless communications, and/or may be via a network (for example, a local network) wired and/or wireless communications.

In various embodiments, the gateway device 110, may include various other modules, components, engines, etc. to provide the functionality as described herein. It will be appreciated that additional components, not shown, may also be part of the gateway device 110, and, in certain embodiments, fewer components than that shown in FIG. 3 may also be used in the gateway device 110.

In various embodiments, firmware of the gateway device 110 may be updated such that the gateway device 110 may provide additional functionality. Such firmware updating may be accomplished, for example, via communications with the management server 150, thereby enabling updating of multiple gateway device 110 remotely and centrally. Additional functionality may include additional ways of communicating with additional devices 120, additional configurations or options for configurations, and/or the like.

Example Embodiments of Network Provider Map

FIGS. 4A-4D illustrate various examples of a network provider map. The examples of a network provider map illustrated in FIGS. 4A-4D are for purposes of describing the processes of dynamic network handovers only and by no way limit the illustration of network provider maps.

An example network provider map is shown in FIGS. 4A-4D, which may include a first map tile 402, a second map tile 404, and a third map tile 406. The network provider map can further include location indicators 408, 418, and 428. The location indicators 408, 418, and 428 may represent different locations of the gateway device 110 within the network provider map. The map tiles may represent geographical areas or geographical regions of a geographical map. The network provider map and the map tiles described herein may be overlaid over, or comprise a part of, a geographical map.

Each of the first map tile 402, the second map tile 404, and the third map tile 406 may include information associated with network providers associated with the gateway device 110 and/or organization(s) associated with the gateway device 110. For example, each of the first map tile 402, the second map tile 404, and the third map tile 406 may include information associated with two network providers, three network providers, five network providers, ten network providers, and the like. The network providers associated with the first map tile 402, the second map tile 404, the third map tile 406 may be different or the same. In some embodiments, each of the map tiles may be associated with a network provider that has the best/better network desirability in respective, corresponding map tile.

In various embodiments, each of the first map tile 402, the second map tile 404, and the third map tile 406 may be associated with network desirability information of network providers associated with the gateway device 110 and/or organization(s) associated with the gateway device 110. For example, the first map tile 402 may be associated with Network Provider A and Network Provider B that may be associated with the gateway device 110. Moreover, as described herein, the first map tile 402 may be associated with a network desirability information associated with the Network Provider A and Network Provider B.

In the examples illustrated by FIGS. 4A-4D, the first map tile 402 may represent a geographical area in which Network Provider A has high network desirability. The third map tile 406 may represent a geographical area in which Network Provider B has high network desirability. The second map tile 404, which may be an overlap between the first map tile 402 and the third map tile 406, may represent a geographical area in which both Network Provider A and Network Provider B have high network desirability.

In some embodiments, for example, the network desirability information may include a network desirability index. The network desirability index may be a number ranging between 0 and 1, between 0 and 10, between 0 and 100, or the like. The network desirability index may represent a degree of network desirability. For example, a network desirability index having a small value may represent poor, inadequate, or low network desirability, a network desirability index having a large value may represent good, adequate, or high network desirability. By comparing network desirability index of different network providers, the gateway device 110 may determine which network provider has the better/poorer network desirability.

Figure 4A:
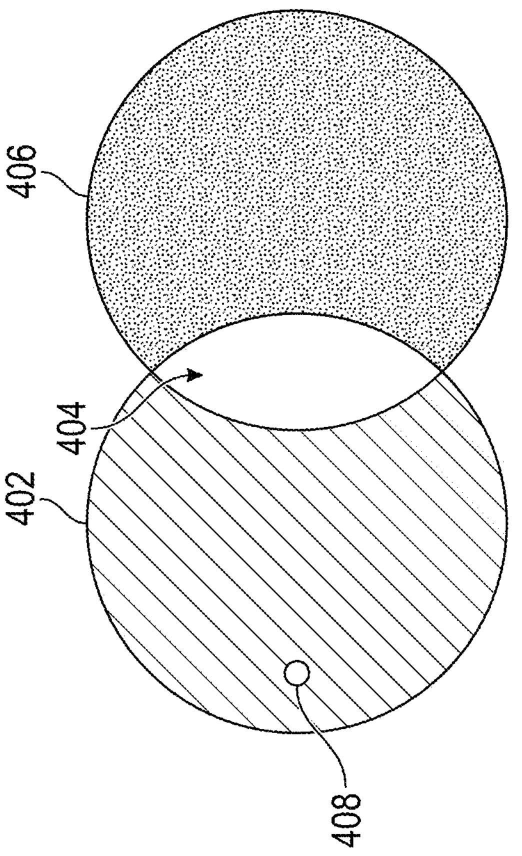
FIGS. 4A-4D illustrate example diagram representing an example network provider map, according to various embodiments of the present disclosure.
Figure 4B:
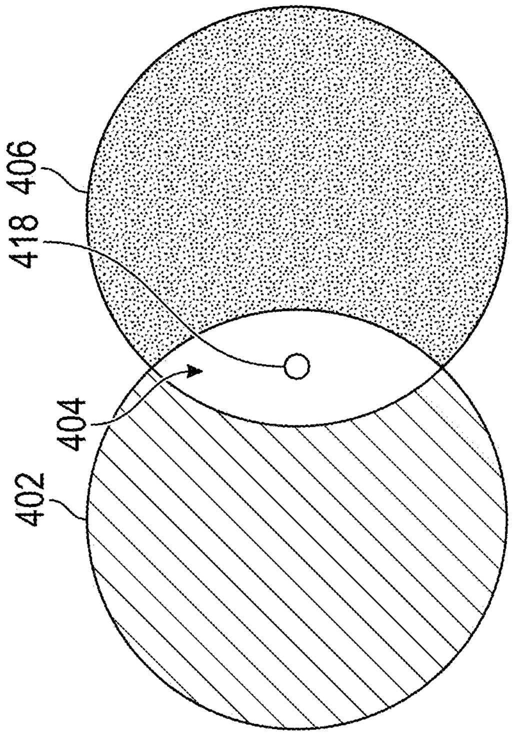
Figure 4C:
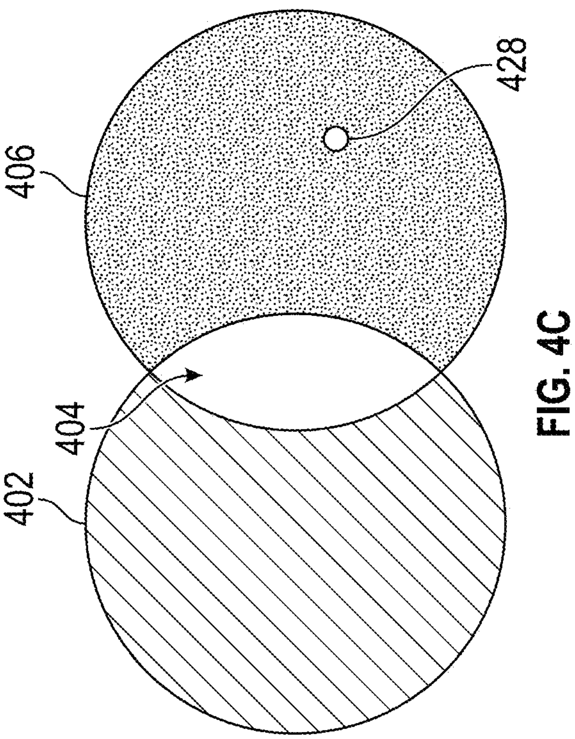
Figure 4D:
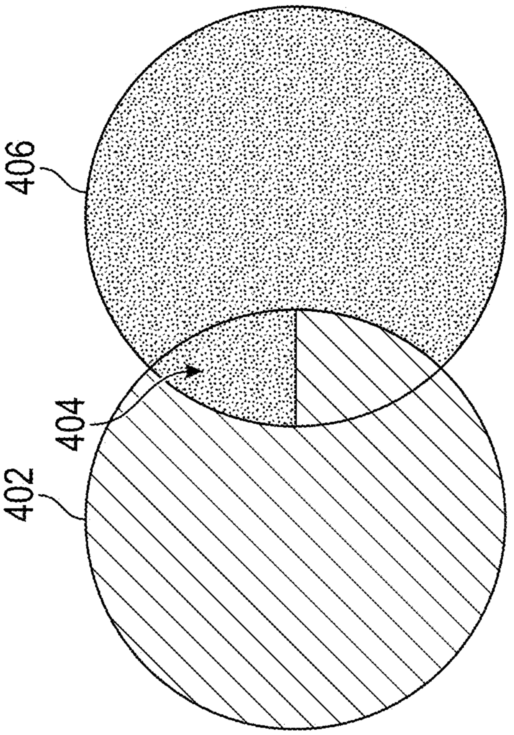
Figure 5:
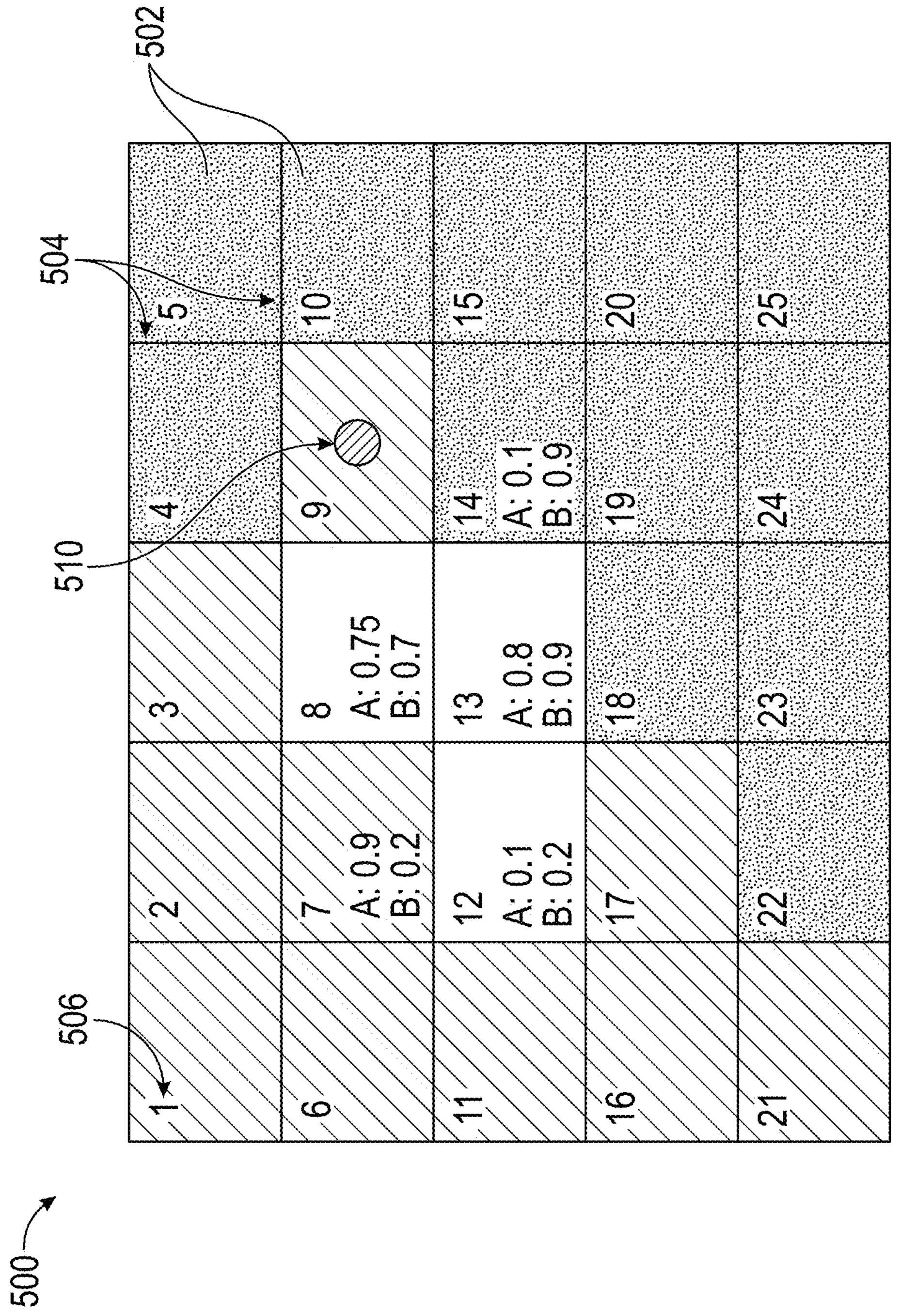
FIG. 5 illustrates an example network provider map, according to various embodiments of the present disclosure.

FIG. 5 illustrates another example network provider map 500 according to various embodiments described herein. The network provider map 500 may include map tiles 502, grid lines 504, map tile identifiers 506, and a location indicator 510. As described herein, one or more network provider maps may be stored in the gateway device, and may be used by the gateway device to implement the various functionality described herein. The stored network provider maps may be stored on the gateway device during manufacture of the gateway device, and may be updated thereafter periodically or on demand, via communication with the management server. FIGS. 4A-4D and 5 provide visual representations of example network provider maps for illustrative and explanatory purposes, however it is to be understood that the network providers maps may or may or may not be displayed by the gateway device visually, and may cover a much larger geographical area (e.g., a city, country, multiple countries, a continent, etc.) that are represented in the examples of FIGS. 4A-4D and 5.

The grid lines 504 may define boundaries of each of the map tiles 502. In various embodiments, the grid lines 504 may extend vertically and horizontally to define a rectangular grid on the network provider map 500. The grid on the network provider map 500 may be regular or irregular. The sizes or shapes of the map tiles 502 may or may not be the same. The shape of the map tiles 502 may be rectangular, square, quadrilateral, triangular, hexagonal, circular, another shape, and the like. The boundaries of the map tiles 502 may not be straight. In various implementations, the map tiles may or may not overlap with one another. In various implementations, the map tiles may each correspond to a same size geographical area, or varying sizes of geographical areas. For example, the map tiles may correspond to geographical areas of approximately 1 block, 1 square mile, 5 square miles, 10 square miles, and/or any other size of geographical area.

Each map tile 502 may be associated with a network provider that has the best/better network desirability for the corresponding map tile 502. For example, map tile "7" of the network provider map 500 may be associated with Network Provider A since Network Provider A's network desirability index (that is, 0.9) is greater than that of Network Provider B (that is, 0.2) Likewise, map tile "14" of the network provider map 500 may be associated with Network Provider B since Network Provider B's network desirability index (that is, 0.9) is greater than that of Network Provider A (that is, 0.1). Additionally, some of the map tiles 502 of the network provider map 500 may not be associated with any of the network providers associated with the gateway device 110 for various reasons. For example, map tile "12" of the network provider map 500 may not be associated with either Network Provider A or Network Provider B because network desirability indexes for both networks are bad. Likewise, map tile "13" of the network provider map 500 may not be associated with either Network Provider A or Network Provider B because network desirability indexes for both networks are good. In some embodiments, the map tiles are not "associated" with any particular network provider, but rather each of the map tiles is associated with network provider desirability information as described herein.

In some embodiments, the map tiles 502 may be given a respective corresponding map tile identifier 506 that can uniquely identify each of the map tiles 502. The map tile identifiers 506 may include alphabets, numbers, or both. The map tile identifiers 506 may be assigned in a specific order. For example, as shown in FIG. 5, the first map tile 502 located at the top left corner may be given "1" as its map tile identifier 506, while the last map tile 502 located at the bottom right corner may be given "25" as its map tile identifier 506. In some embodiments, the map tile identifier 506 may be generated at random.

In operation, each of the map tiles 502 may include network information of network providers associated with the gateway device 110. In the example illustrated in FIG. 5, the gateway device 110 is associated with network providers A and B and each of the map tiles 502 may be associated with network desirability information of network providers A and B. In some embodiments, each of the map tiles 502 may be associated with network desirability indexes described herein. For example, map tile "13" may include network desirability indexes of 0.8 and 0.9 for Network Provider A and Network Provider B, respectively.

As described herein, a network provider map 500 may be associated with one or more network providers such that it contains network desirability information associated with the one or more network providers. Alternatively, in some embodiments, each network provider map 500 may be associated with a single network provider. For example, when the gateway device 110 is activated on an initial network provider (for example, Network Provider A), it may have access to a network provider map associated with the initial network provider. When the gateway device 110 is simultaneously activated on the initial network provider and a second network provider, it may have access to a network provider map associated with the initial network provider and another network provider map associated with the second network provider. Alternatively, a gateway device 110 may have access to network provider maps associated with each of network providers that it is associated with, regardless of which network provider it is activated on.

Example Embodiments of Network Handovers

In operation, as discussed herein, the gateway device 110 may activate on an initial network provider based at least in part on network desirability information and/or preference information associated with network providers associated with the gateway device 110. For example, the preference information may be provided by users or organizations associated with the gateway device 110. The preference information may be based at least in part on cost, network desirability, network reliability, network connectivity, network data transmissibility, and the like associated with each of available network providers associated with the gateway device 110. The preference information may or may not depend on the location of the gateway device 110. For example, the preference information may indicate that Network Provider A is a preferred network provider when the gateway device 110 is located within urban areas and Network Provider B is a preferred network provider when the gateway device 110 is located within suburban areas. In some embodiments, the preference information may indicate which network provider is prioritized in different situations/circumstances.

Referring to FIG. 4A, the location of the gateway device 110 is represented by the location indicator 408, which is positioned within the first map tile 402. As such, the location of the gateway device 110 may be associated with the first map tile 402 of the network provider map. The location of the gateway device 110 represented by the location indicator 408 may be determined by the location determination module 310 of the gateway device 110.

In operation, the gateway device 110 may choose an initial network provider for activation, for example, network provider A, based at least in part on the network desirability information as described herein. In some embodiments, the gateway device 110 may determine the initial network provider based at least in part on its location. In the example illustrated in FIG. 4A, the gateway device 110 may determine its initial network provider based at least in part on comparison or analysis of network desirability information associated with the first map tile 402. An example method of determining an initial network provider will be further described herein.

In operation, the gateway device 110 may move from one location associated with one map tile to another location associated with a different map tile. When the gateway device 110 moves to a subsequent, different map tile, it may receive/retrieve/access network desirability information associated with the subsequent map tile. Based at least in part on the network desirability information of network providers associated with the subsequent map tile, the gateway device 110 may determine whether to perform an additional network activation and/or handover (that is, switch from one network provider to another).

In some embodiments, the gateway device 110 may prefer to stay activated on its initial network provider, and not activate on a second network provider. As such, the gateway device 110 may consider preference information in addition to network desirability information to determine whether to switch from its initial network provider to a different network provider, and to activate on that different network provider. The preference information may provide different standard/condition for performing network activations and/or handovers in following example situations: (1) when the gateway device 110 is activated only on its initial network provider; and (2) when the gateway device 110 is activated on more than one network providers. As described herein, when the gateway device 110 is activated only on its initial network provider, it may prefer to remain on the initial network provider. On the other hand, when the gateway device 110 is activated on more than one network providers, it may prefer to switch to a network provider that provides the best (or the better) network desirability.

For example, the gateway device 110 may move from the first map tile 402 to the second map tile 404 as illustrated by the position indicators 408 and 418 in FIGS. 4A and 4B. The gateway device 110 may be activated only on, for example, Network Provider A. When the gateway device 110 determines that it has moved to the second map tile 404, it may receive/retrieve/access network desirability information associated with the second map tile 404. The gateway device 110 may analyze the network desirability information associated with the second map tile 404 to determine whether to perform a network activation and/or handover (that is, switch from Network Provider A to a different network provider (for example, Network Provider B).

In some embodiments, when the gateway device 110 is activated on more than one network provider (for example, Network Provider A and Network Provider B), the management server 150 may generate updated map tiles that identify network providers that have the best/better network desirability. For example, the gateway device 110 initially activated on a first network may later be activated on a second network after moving to a new, different location. Upon the gateway device 110 being activated on the second network, the management server 150 may update at least one or all of map tiles of a network provider map. For example, each of updated map tiles may be associated with a network provider having a network desirability (for example, network desirability index) greater than network desirability of other network providers. In some embodiments, as shown in FIG. 4D, at least a portion of a map tile (for example, the second map tile 404) may be associated with a network provider as described herein. The association between a map tile or a portion of a map tile may be represented using different colors, shadings, or patterns. In some examples, network provider identifies, names, abbreviations, and the like may be used to indicate association between a map tile or a portion of a map tile and a network provider.

A map tile or at least a portion of a map tile may be identified with different colors (or a network provider identifier) to identify a network provider, as illustrated in FIG. 4D.

As discussed herein, the gateway device 110 may apply different conditions/thresholds/standards when determining whether to perform a network activation and/or handover upon moving from the first map tile 402 to the second map tile 404. Since the gateway device 110 is activated Network Provider A, it may prefer to stay on Network Provider A unless, for example, Network Provider A has poor network desirability in the second map tile 404 and/or Network Provider B has much better network desirability than Network Provider A in the second map tile 404.

For example, the gateway device 110 may perform a network handover in second map tile 404 (that is, activate on and switch to Network Provider B) and subsequently move from the second map tile 404 to the third map tile 406, as illustrated by the location indicators 418 and 428 in FIGS. 4B and 4C. When the gateway device 110 determines that it is located in the third map tile 406, it can receive/retrieve/access network desirability information associated with the third map tile 406. The gateway device 110 may analyze the network desirability information associated with the third map tile 406 to determine whether to perform another network handover upon moving to the third map tile 406.

In various embodiments, when the gateway device 110 switches to a different network provider, the gateway device 110 may be activated on both the initial network provider and the new, different network provider. In some embodiments, the gateway device 110 may only be activated on the new, different network provider (for example, deactivated on the previous network provider).

Accordingly, in an embodiment, the gateway device 110 may prefer to remain activated on only an initial network provider if the network desirability of that initial network provider remains sufficiently good (e.g., satisfying a threshold or condition) as the gateway device 110 moves from one map tile to another. This is because, although other network providers may be available, there may be a cost to activating on a second network provider. However, if the network desirability of that initial network provider does not remain sufficiently good, the gateway device 110 may then, in certain circumstances, activate on the second network provider. Those circumstances may include, for example, that the network desirability of the second network provider is sufficiently good (e.g., satisfying a threshold or condition).

In some embodiments, a predetermined temporal condition may be satisfied before the gateway device 110 activates on the second network provider. The gateway device 110 may activate on the second network provider if the network desirability of the initial network, for example, fails to satisfy a predetermined threshold or condition, for a predetermine length of time. For example, the predetermined length of time may be ten minutes. As such, if the network desirability of the initial network fails to satisfy a predetermined threshold or condition for more than ten minutes, the gateway device 110 may activate on the second network provider.

Once activated on both the first and second network providers, the gateway device 110 may thereafter handoff between the first and second network providers, as the gateway device 110 moves from one map tile to another, based on relative or absolute network desirabilities of the two networks. Alternatively, once activated on both the first and second network providers, the gateway device 110 may thereafter handoff between the first and second network providers, as the gateway device 110 moves from one map tile to another, based on various conditions or other criteria associated with the two networks, optionally including the relative or absolute network desirabilities of the two networks. Such conditions or other criteria may include, for example, costs of data transfer on the two networks, among other conditions or criteria.

Referring to FIG. 5, the location of the gateway device 110 may change from one location to another such that the location indicator 510 moves from one map tile 502 to another map tile 502. When the gateway device 110 moves to a different map tile 502, it may use information including, but not limited to, network desirability information, preference information, and the like, to determine whether to perform a network handover (for example, switch from one activated network provider to another activated network provider or activate on another network provider). Various examples of network activations and handovers are described herein as non-limiting examples.

In some embodiments, the gateway device 110 may compare network desirability information (for example, network desirability index) of its current (or present) network provider to that of another, different network provider to determine whether to perform a network activation and/or handover. For example, the gateway device 110 may determine to not to perform a new network activation or a network handover if the network desirability index of the current network provider is greater than that of the other network provider. In contrast, the gateway device 110 may decide to perform a network activation and/or handover, for example, activate on the other network provider (if the other network provider has not yet been activated) or switch from the current network provider to the other network provider (if the other network provider has already been activated), if the network desirability index of the other network provider is greater than that of the current network provider.

In some embodiments, the gateway device 110 may analyze the network desirability information, for example, of its current network provider (for example, Network Provider A) and the other network provider (for example, Network Provider B), with predetermined conditions to determine whether to perform network activations and/or handovers. The predetermined conditions may include a first desirability condition and a second desirability condition. The first desirability condition may be associated with the network desirability information of a first network provider (for example, Network Provider A). The second desirability condition may be associated with the network desirability information of a second network provider (for example, Network Provider B). In some embodiments, the first network provider may be a network provider the gateway device 110 is currently activated on. Additionally or optionally, the second network provider may be another network provider the gateway device 110 may or may not be activated on. In some embodiments, the second desirability condition may be associated with network desirability information of more than one other network providers different from the first network provider. While the examples described below are based on two network providers, in various implementations, similar functionality may be applied to three or more network providers.

Figure 7:
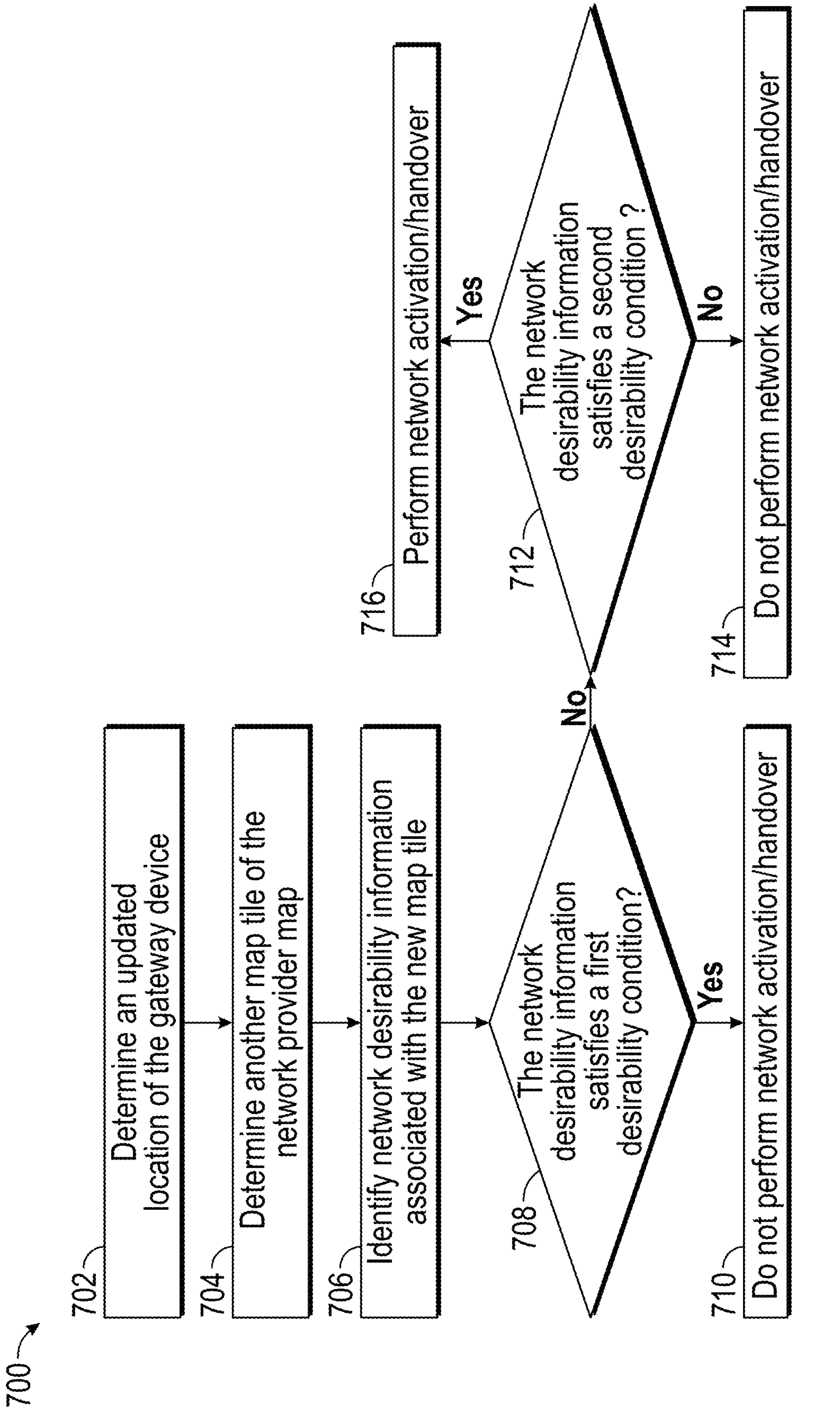
FIG. 7 illustrates an example method of performing dynamic network activations and/or handovers for a gateway devices, according to various embodiments of the present disclosure.

In operation, the gateway device 110 may use the predetermined conditions in conjunction with each other to determine whether to perform network activations and/or handovers. An example method of determining whether to perform network activation and/or handover with predetermine conditions is illustrated in FIG. 7. For example, the gateway device 110 may remain activated on its current network provider (for example, Network Provider A) and not perform network activation or handover so long as the network desirability index of the current network provider satisfies the first desirability condition. In another example, if the network desirability index of the current network provider (for example, Network Provider A) fails to satisfy the first desirability condition, the gateway device 110 may not perform a network activation or handover (for example, remain activated on the current network provider) so long as the network desirability index of the other network provider (for example, Network Provider B) also does not satisfy the second desirability condition. If the network desirability index of the other network provider (for example, Network Provider B) does satisfy the second condition, the gateway device 110 may perform a network activation and/or handover (for example, activate the other network provider (if the other network provider has not yet been activated) or switch from the current network provider to the other network provider (if the other network provider has already been activated)).

In various embodiments, the predetermined conditions may be associated with respective, corresponding threshold network desirability values. The predetermined conditions may include a first desirability condition associated with a first threshold value. Additionally, the predetermined condition may include a second desirability condition associated with a second threshold value. For example, the gateway device 110 may not perform a network activation and/or handover (for example, remain activated on its current network provider) so long as the network desirability index of the current network provider satisfies the first desirability condition, for example, greater than 0.75. In another example, if the network desirability index of the current network provider (for example, Network Provider A) fails to satisfy the first desirability condition, the gateway device 110 may still not perform a network activation and/or handover (for example, remain activated on the current network provider) so long as the network desirability index of the other network provider does not satisfy the second desirability condition, for example, greater than 0.6. On the other hand, if the network desirability index of the current network provider (for example, Network Provider A) fails to satisfy the first desirability condition, the gateway device 110 may perform a network activation and/or handover (for example, activate on and/or handover to an other network provider) when the network desirability index of the other network provider does satisfy the second desirability condition, for example, greater than 0.6.

In some embodiments, the predetermined conditions, for example, the first desirability condition and the second desirability condition, may or may not be the same or similar to one another. Additionally, the desirability conditions associated with network activations (e.g., when deciding whether to activate on a second network) may differ from those associated with network handovers (e.g., handing off to a second network on which the gateway device is already activated). For example, in some implementations in which the desirability conditions are the same or similar to one another (e.g., equalized or equal to one another), the predetermined conditions may be associated with the same threshold desirability values. Additionally or alternatively, equalized conditions may be associated with the same desirability conditions.

When the predetermined conditions are not the same or similar to one another (e.g., not equalized or equal to one another), the predetermined conditions may be associated with different desirability values or desirability conditions. For example, the first desirability condition and the second desirability condition may be equalized when the gateway device 110 is activated on both a first network provider associated with the first desirability condition and a second network provider associated with the second desirability condition (for example, in cases in which the gateway device is determining whether to handoff from among multiple activated network providers). In some examples, the first desirability condition and the second desirability condition may not be equalized when the gateway device 110 is activated on only one of the first network provider and the second network provider (e.g., in cases in which the gateway device is determining whether to activate on a second network provider).

In some embodiments, the conditions described herein may reflect different network activation and/or handover situations for the gateway device 110. For example, in some situations, the gateway device 110 may compare network desirability information of more than one network providers and activate on a network provider that has the best/better network desirability. In some examples, the gateway device 110 may prefer to stay activated on its current network provider.

In some embodiments, the conditions may reflect preference information, for example, provided by the management server 150, the user device(s) 160, or users or organizations associated with the gateway device 110. The preference information may be based at least in part on costs associated with remaining on the initial network provider, costs associated with activating on another network provider, costs associated with maintaining just the initial network provider, costs associated with maintaining the initial and the other network provider, and the like.

Example 1A: Only One Network Provider is Activated—Current Network Provider Satisfies Condition & Other Network Provider does not Satisfy Condition For example, the gateway device 110 may have Network Provider A as its current (or present) network provider and may move from map tile "1" to map tile "7" of the network provider map 500. Map tile "7," as illustrated in FIG. 5, may be associated with network desirability information for the Network Provider A and Network Provider B. The network desirability information associated with map tile "7", for example, may include network desirability index of 0.9 for Network Provider A and network desirability index of 0.2 for Network Provider B.

In some embodiments, the gateway device 110 may use predetermined conditions to determine whether to perform network handovers. For example, the gateway device 110 may utilize a method illustrated in FIG. 7 to determine whether to perform network activations. For example, a first desirability condition of the predetermined conditions may ask whether the network desirability index of a current network provider (for example, Network Provider A) is greater than 0.6. For example, a second desirability condition of the predetermined conditions may ask whether the network desirability index of another network provider (for example, Network Provider B) is greater than 0.75. (for example, in this example the two conditions are not equal.)

In map tile "7," the first desirability condition is satisfied since the network desirability index of Network Provider A (that is, 0.9) is greater than 0.6. On the other hand, the second desirability condition is not satisfied since the network desirability index of Network Provider B (that is, 0.1) is not greater than 0.8. Accordingly, the gateway device 110 may decide to not perform network activation or handover (for example, remain activated on Network Provider A instead of activating on and switching to Network Provider B).

Example 1B: Only One Network Provider is Activated—Current Network Provider does not Satisfy Condition & Other Network Provider Satisfies Condition In another example, the gateway device 110 may have Network Provider A as its current (or present) network provider and may move from map tile "1" of the network provider map 500 to map tile "14" of the network provider map 500. Map tile "14," as illustrated in FIG. 5, may be associated with network desirability information for the Network Provider A and Network Provider B. The network desirability information associated with map tile "14", for example, may include network desirability index of 0.1 for Network Provider A and network desirability index of 0.9 for Network Provider B.

In some embodiments, the gateway device 110 may use predetermined conditions to determine whether to perform network handovers. For example, the gateway device 110 may utilize a method illustrated in FIG. 7 to determine whether to perform network activations. For example, a first desirability condition of the predetermined conditions may ask whether the network desirability index of an initial network provider (for example, Network Provider A) is greater than 0.6. For example, a second desirability condition of the predetermined conditions may ask whether the network desirability index of another network provider (for example, Network Provider B) is greater than 0.75.

In map tile "14," the first desirability condition is not satisfied since the network desirability index of Network Provider A (that is, 0.1) is not greater than 0.6. On the other hand, the second desirability condition is satisfied since the network desirability index of Network Provider B (that is, 0.8) is greater than 0.75. Accordingly, the gateway device 110 may perform a network activation and handover (for example, activate on and switch to Network Provider B). Occasionally, the gateway device 110 may not be able to activate on a new network provider (for example, Network Provider B) for various reasons. In such circumstances, the gateway device 110 may remain activated on its current network provider (for example, Network Provider A).

Example 1C: Only One Network Provider is Activated—Current Network Provider Satisfies Condition & Other Network Provider Satisfies Condition In another example, the gateway device 110 may have Network Provider A as its current (or present) network provider and may move from map tile "1" of the network provider map 500 to map tile "13" of the network provider map 500. Map tile "13," as illustrated in FIG. 5, may be associated with network desirability information for the Network Provider A and Network Provider B. The network desirability information associated with map tile "13", for example, may include network desirability index of 0.8 for Network Provider A and network desirability index of 0.9 for Network Provider B.

In some embodiments, the gateway device 110 may use predetermined conditions to determine whether to perform network handovers. For example, the gateway device 110 may utilize a method illustrated in FIG. 7 to determine whether to perform network activations. For example, a first desirability condition of the predetermined conditions may ask whether the network desirability index of an initial network provider (for example, Network Provider A) is greater than 0.6. For example, a second desirability condition of the predetermined conditions may ask whether the network desirability index of another network provider (for example, Network Provider B) is greater than 0.75.

In map tile "13," the second desirability condition is satisfied since the network desirability index of Network Provider B (that is, 0.9) is greater than 0.75. However, the first desirability condition is also satisfied since the network desirability index of Network Provider A (that is, 0.8) is greater than 0.6. Accordingly, the gateway device 110 may not perform a network activation or handover (for example, not activate on Network Provider B) and instead remain activated on Network Provider A. In the above example, the gateway device 110 may not perform network handover for various reasons. For example, as discussed herein, activating on a new, different network provider may be associated with additional costs that may not be necessary if the gateway device 110 remained with its current network provider. Since network providers may remain activated once they are activated, the benefit of providing marginally better network desirability may be outweighed by costs associated with having another network provider activated.

Example 1D: Only One Network Provider is Activated—Current Network Provider does not Satisfy Condition & Other Network Provider does not Satisfy Condition In another example, the gateway device 110 may have Network Provider A as its current (or present) network provider and may move from map tile "1" of the network provider map 500 to map tile "12" of the network provider map 500. Map tile "12," as illustrated in FIG. 5, may be associated with network desirability information for the Network Provider A and Network Provider B. The network desirability information associated with map tile "12", for example, may include network desirability index of 0.1 for Network Provider A and network desirability index of 0.2 for Network Provider B.

In some embodiments, the gateway device 110 may use predetermined conditions to determine whether to perform network handovers. For example, the gateway device 110 may utilize a method illustrated in FIG. 7 to determine whether to perform network activations. For example, a first desirability condition of the predetermined conditions may ask whether the network desirability index of an initial network provider (for example, Network Provider A) is greater than 0.6. For example, a second desirability condition of the predetermined conditions may ask whether the network desirability index of another network provider (for example, Network Provider B) is greater than 0.75.

In map tile "12," the first desirability condition is not satisfied since the network desirability index of Network Provider A (that is, 0.1) is not greater than 0.6. On the other hand, the second desirability condition is also not satisfied since the network desirability index of Network Provider B (that is, 0.2) is not greater than 0.75. Despite the low network desirability index of Network Provider A, the gateway device 110 may not perform a network activation or handover, and instead remain activated on Network Provider A. This may be because despite Network Provider A's low network desirability index, Network Provider B too has a low network desirability index.

Example 2: Multiple Network Providers are Activated

In operation, the gateway device 110 may be activated on more than one network provider. For example, the gateway device 110 may be activated on Network Provider A and Network Provider B. When the gateway device 110 is activated on more than one network provider, network handover may include switching between the activated network providers (for example, Network Provider A and Network Provider B) to operate on a network provider that provides the best (or the better) network desirability or otherwise staying on a current network provider if the network desirabilities of the multiple activated networks are similar or the same.

For example, the gateway device 110 may be activated on Network Provider A and Network Provider B and move from map tile "1' to map tile "13." As shown in FIG. 5, the map tile "13" is associated with network desirability index of 0.8 for Network Provider A and network desirability index of 0.9 for Network Provider B. The gateway device 110, upon determining that it has moved to map tile "13," it may access/receive/retrieve network desirability information associated with map tile "13." The gateway device 110 may analyze the network desirability information (for example, network desirability indexes) associated with the map tile "13" and may determine that Network Provider B providers better network desirability than Network Provider A. Accordingly, the gateway device 110 may perform a network handover by switching from Network Provider A to Network Provider B.

In some embodiments, regardless of whether network providers all provide adequate or inadequate network desirability, the gateway device 110 may decide to select a network provider that provides the best (or the better) network desirability. For example, the gateway device 110 may be activated on Network Provider A and Network Provider B and move from map tile "1' to map tile "12." As shown in FIG. 5, the map tile "12" is associated with network desirability index of 0.1 for Network Provider A and network desirability index of 0.2 for Network Provider B. The gateway device 110 may analyze the network desirability information (for example, network desirability indexes) associated with the map tile "12" and may determine that Network Provider B providers better network desirability than Network Provider A. Accordingly, the gateway device 110 may perform a network handover, for example, by switching from Network Provider A to Network Provider B.

In other embodiments, when the gateway device is activated on multiple network providers, the gateway device 110 may utilize the method illustrated in FIG. 7 to determine whether to perform network handover, but as mentioned above, may use different desirability conditions that those used for determining whether to perform network activation. In these embodiments, the first desirability condition may apply to the currently in-use network provider, and the second desirability condition may apply to a second network provider on which the gateway device is activated, and to which the gateway device may switch. As noted above, when determining handovers (as opposed to activations, as described above), the desirability conditions may be the same or similar (e.g., both 0.5), resulting in a preference to stay on a current network provider, but a lower threshold for switching as compared to the activation scenarios described above. Alternatively, the desirability conditions may be different.

In various implementations, as mentioned above, the network desirability information may include considerations such as, for example, cost. Accordingly, even when activated on multiple network providers, the gateway device may prefer to use a particular network when it provides adequate performance. In these example implementations, referring again to FIG. 7, the first desirability condition may apply to the preferred network provider, and the second desirability condition may apply to a second network provider on which the gateway device is activated, and to which the gateway device may remain or switch. As with the examples noted above, when determining handovers (as opposed to activations, as described above), the desirability conditions may be the same or similar, or they may be different, depending on the network preference of the gateway device.

As noted above, the desirability conditions associated with network activations (e.g., when deciding whether to activate on a second network) may differ from those associated with network handovers (e.g., handing off to a second network on which the gateway device is already activated).

In some embodiments, the gateway device 110 may be activated on, for example, three or more network providers (for example, Network Provider A, Network Provider B, and Network Provider C). The gateway device 110 may be activated on Network Provider A and may, upon moving to a new location, look to switch to a new network provider. As described herein, the gateway device 110 may compare network desirability information of Network Provider A, Network Provider B, and Network Provider C associated with the new location, and may decide to switch from Network Provider A to Network Provider C. However, under certain situations, the gateway device 110 may not be able to switch from Network Provider A to Network Provider C for various types of reasons. In such situations, based at least in part on comparison of network desirability information and desirability conditions associated with Network Provider A and Network Provider B, the gateway device 110 may determine whether to remain on Network Provider A or possibly switch to Network Provider B.

Example Method of Determining an Initial/Default Network Provider

In operation, the gateway device 110 may determine its location via the more location determination devices 312 (e.g., global positioning system (GPS) devices, GLONASS devices, and/or the like) of the location determination module 310. Once the gateway device 110 determines its location, the gateway device 110 may access a network provider map. As described herein, the network provider map (for example, the network provider map as shown in FIG. 4A), may provide information indicating associations between different areas of a map (for example, the map tiles 502 of the network provider map 500 illustrated in FIG. 5) and network providers associated with the gateway device 110. The gateway device 110 may determine its location within the network provider map using the location information provided by the location determination module 310. For example, as shown in FIG. 5, the location of the gateway device 110, as illustrated by the location indicator 510, may be in map tile "9." Based on its location within the network provider map (for example, the network provider map 500), the gateway device 110 may determine which network provider to use for establishing network communication.

In various embodiments, the gateway device 110 may fail to determine its location via the location determination module 310 for various reasons such as location determination device malfunction, lack of network connection for the location determination device 312, and the like. In such situations, the gateway device 110 may establish communication network using a default network provider.

In some embodiments, the management server 150 may provide the default network provider for the gateway device 110. The management server 150 may determine the default network provider based at least in part on a network preference, default setting information, network desirability information, and the like. In some embodiments, the management server 150 may access network subscription information of different network providers, where the network subscription information may include pricing information, subscription term information, and the like associated with network providers. In some cases, network providers may update the network subscription information from time to time. Accordingly, the management server 150 may periodically access the network subscription information and update the default network provider when needed. In some embodiments, users may manually prompt the management server 150 to access and assess the network subscription information, and check whether the default network provider is up-to-date.

Figure 6:
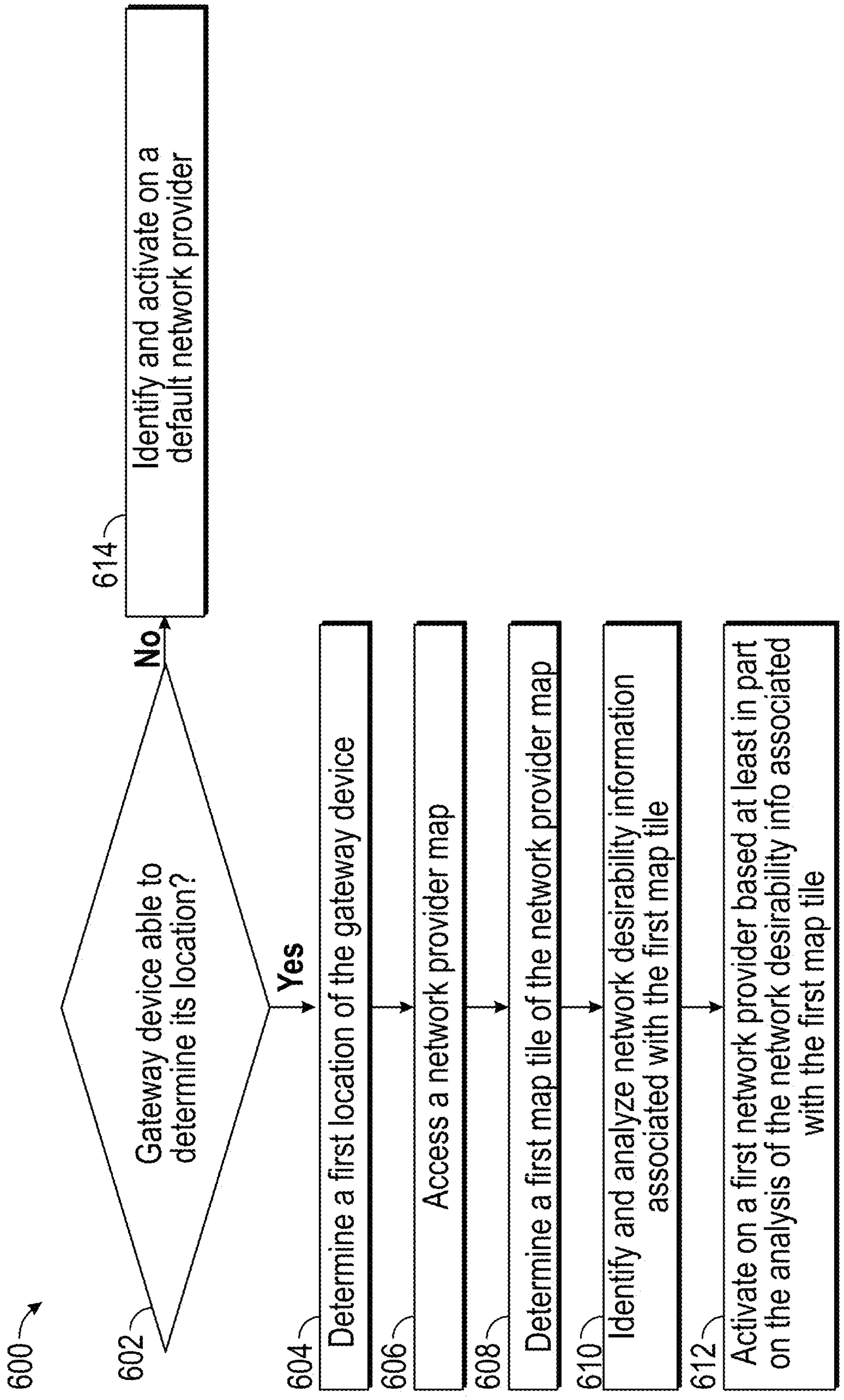
FIG. 6 illustrates an example method of determining an initial network provider for a gateway devices, according to various embodiments of the present disclosure.

FIG. 6 illustrates an example method 600 of determining an initial network provider for the gateway device 110. At block 602, the gateway device 110 determines whether it is able to determine its location. The location of the gateway device 110 may be determined using location information collected by the location determination device 312 of the location determination module 310. If the gateway device 110 is unable to determine its location, the gateway device 110 at block 614 identifies and activates on a default network provider. On the other hand, if the gateway device 110 is able to determine its location, the gateway device 110 at block 604 may identify its location. At block 606, the gateway device 110 may access a network provider map. At block 608, the gateway device 110 may determine a first map tile of the network provider map. The first map tile may be determined based at least in part on the first location and the network provider map. The first location of the gateway device 110 may be within the first map file of the network provider map. At block 610, the gateway device 110 may identify and analyze network desirability information associated with the first map tile. As described herein, the first network provider may be associated with the first map tile of the network provider map. The first network provider may be one of many network providers associated with the gateway device 110. At block 612, the gateway device 110 activates on a first network provider based at least in part on the analysis of the network desirability information associated with the first map tile. As described herein, the gateway device 110 may activate on the first network provider because the first network provider may have network desirability higher than that of other network providers.

In some embodiments, the gateway device 110 may not be able to activate on the first network provider. For example, the gateway device 110 may not be able to establish wireless connection with the first network provider for various types of reasons including, but not limited to, inability to establish IP with the first network provider, high bit error rates, and the like. In such cases, the gateway device 110 may decide not to activate on the first network provider, and instead activate on a second network provider different from the first network provider.

Example Method of Performing Network Handovers when a Single Network Provider is Activated FIG. 7 illustrates an example method 700 of performing a network handover when a single network provider is activated for the gateway device(s) 110. At block 702, the gateway device 110 determines an updated location. As described herein, the gateway device 110 may determine its location using the location determination module 310. At block 704, the gateway device 110 identifies another map tile of the network provider map. The new map tile may be different from a previous map tile the gateway device 110 was located within. The identification of the new map tile may be based at least in part on the updated location of the gateway device 110. The updated location of the gateway device 110 may be associated with the new map tile.

At block 706, the gateway device 110 identifies network desirability information associated with the new map tile. As described herein, each map tile of a network provider map may be associated with network desirability information, which may include network desirability index associated with each of network providers associated with the gateway device 110. For example, the gateway device 110 may be associated with Network Provider A and Network Provider B. The network provider map for the gateway device 110 may in turn include network desirability information associated with Network Provider A and Network Provider B.

At block 708, the gateway device 110 analyzes the network desirability information associated with the updated map tile to determine whether the network desirability information satisfies a first desirability condition. As described herein, the network desirability information may include network desirability index associated with each of network providers, for example, Network Provider A and Network Provider B, associated with the gateway device 110. If the first desirability condition is satisfied, the gateway device 110, at block 710, does not perform a network activation (for example, maintains activation on Network Provider A, and does not activation Network Provider B).

If the first desirability condition is not satisfied, the gateway device 110, at block 712, analyzes the network desirability information associated with the updated map tile with respect to a second desirability condition. If the second desirability condition is not satisfied, the gateway device 110, at block 714, does not perform a network activation (for example, maintains activation on Network Provider A, and does not activation Network Provider B). If the second desirability condition is satisfied, the gateway device 110, at block 716, performs a network activation (for example, activates on and switches to a new network provider). As described herein, if, for example, the gateway device 110 is unable to activate on Network Provider B (a new network provider) for various reasons, the gateway device 110 remain activated on Network Provider A instead of activating on Network Provider B.

In various embodiments, the first desirability condition and the second desirability condition may be associated with different network providers. For example, the first desirability condition may be associated with an initial network provider (for example, Network Provider A) of the gateway device 110, and the second desirability condition may be associated with another network provider (for example, Network Provider B) associated with the gateway device 110.

In some embodiments, the first and the second desirability conditions may be associated with the same (for example, equalized) or different (for example, not equalized) threshold network desirability index values. When the gateway device 110 is activated on just one network provider, it may apply desirability conditions that are not equalized. For example, a first desirability condition may be associated with a first threshold value of 0.6 while a second desirability condition may be associated with a second threshold value of 0.75, where the first desirability condition is associated with a current (or present) network provider for the gateway device 110 and the second desirability condition is associated with another network provider.

The difference between the first desirability condition and the second desirability condition may reflect certain preference for performing network handovers. In some embodiments, the difference between the first desirability condition and the second desirability condition (for example, not equalized as described herein) may reflect a preference to remain with an initial network provider and not activate on another, different network provider. For example, as described herein, the first desirability condition may be associated with the initial network provider and may be associated with the first threshold value of 0.6 and the second desirability condition may be associated with a network provider other than the initial network provider and may be associated with the second threshold value of 0.75. As such, per the method 700 described herein, the gateway device 110 will remain on the initial network provider so long as the network desirability index of the initial network provider is greater than 0.6. However, the gateway device 110 will not activate on and switch to a new network provider unless network desirability index of the new network provider is greater than 0.75. Accordingly, such desirability conditions may indicate that wider range of network desirability index (between 0.6 and 1.0) may be acceptable for the initial network provider than for the new network provider (between 0.75 and 1.0).

Example Method of Performing Network Handovers when One or More Network Providers are Activated In operation, the gateway device 110 may be activated on more than one network provider, for example, Network Provider A and Network Provider B. Depending on whether the gateway device 110 is activated on just one network provider or more than one network providers, the gateway device 110 may apply different network desirability conditions. In some embodiments, the network desirability conditions (or thresholds) may automatically update depending on the number of network providers activated for the gateway device 110.

For example, the gateway device 110 may initially be activated only on Network Provider A, and have a first desirability condition associated with Network Provider A and a second desirability condition associated with Network Provider B. The first desirability condition and the second desirability condition may not be equalized to reflect the preference the gateway device 110 may have on its current network provider (for example, Network Provider A). For example, by configuring the first desirability condition less stringent than the second desirability condition, the gateway device 110 may be configured to prefer Network Provider A over Network Provider B.

In some embodiments, the first desirability condition and the second desirability condition may change when the gateway device 110 is activated on both Network Provider A and Network Provider B. The first desirability condition and the second desirability condition may or may not be equalized when the gateway device 110 is activated on both Network Provider A and Network Provider B When the conditions are equalized, for example, one condition may not be less or more stringent than other condition(s). In some examples, the first desirability condition and the second desirability condition may be the same when the conditions are equalized. In some embodiments, equalized conditions may be associated with the same threshold condition or threshold value. For example, prior to being equalized, the first desirability condition may have a first desirability threshold value of 0.5 and the second desirability condition may have a second desirability threshold value of 0.75. When equalized, the first desirability threshold value and the second desirability threshold value may both by 0.5.

In various embodiments, the first desirability condition and the second desirability condition may not be equalized when the gateway device 110 is activated on both Network Provider A and Network Provider B. Such configuration, as described herein, may reflect the preference of the gateway device 110. For example, if the gateway device 110 prefers to be activated on Network Provider B over Network Provider A, it may adjust the desirability conditions (for example, the first desirability condition and the second desirability condition) accordingly so that the conditions favor activation on Network Provider B over Network Provider A, and vice versa.

In some embodiments, the first desirability condition and the second desirability condition may not change when the gateway device 110 is activated on both Network Provider A and Network Provider B.

In some instances, the gateway device 110 may not be able to establish a reliable connection with a network provider that otherwise satisfies desirability conditions. For example, the gateway device 110 may not be able to establish a reliable connection with a network provider for many reasons including, but not limited to, inability to establish IP with the network provider, high bit error rates, and the like. In such instances, the gateway device 110 may decide handover and/or activate on a second network provider instead of remaining on the currently preferred network provider.

Example Method of Generating a Network Provider Map

Figure 8:
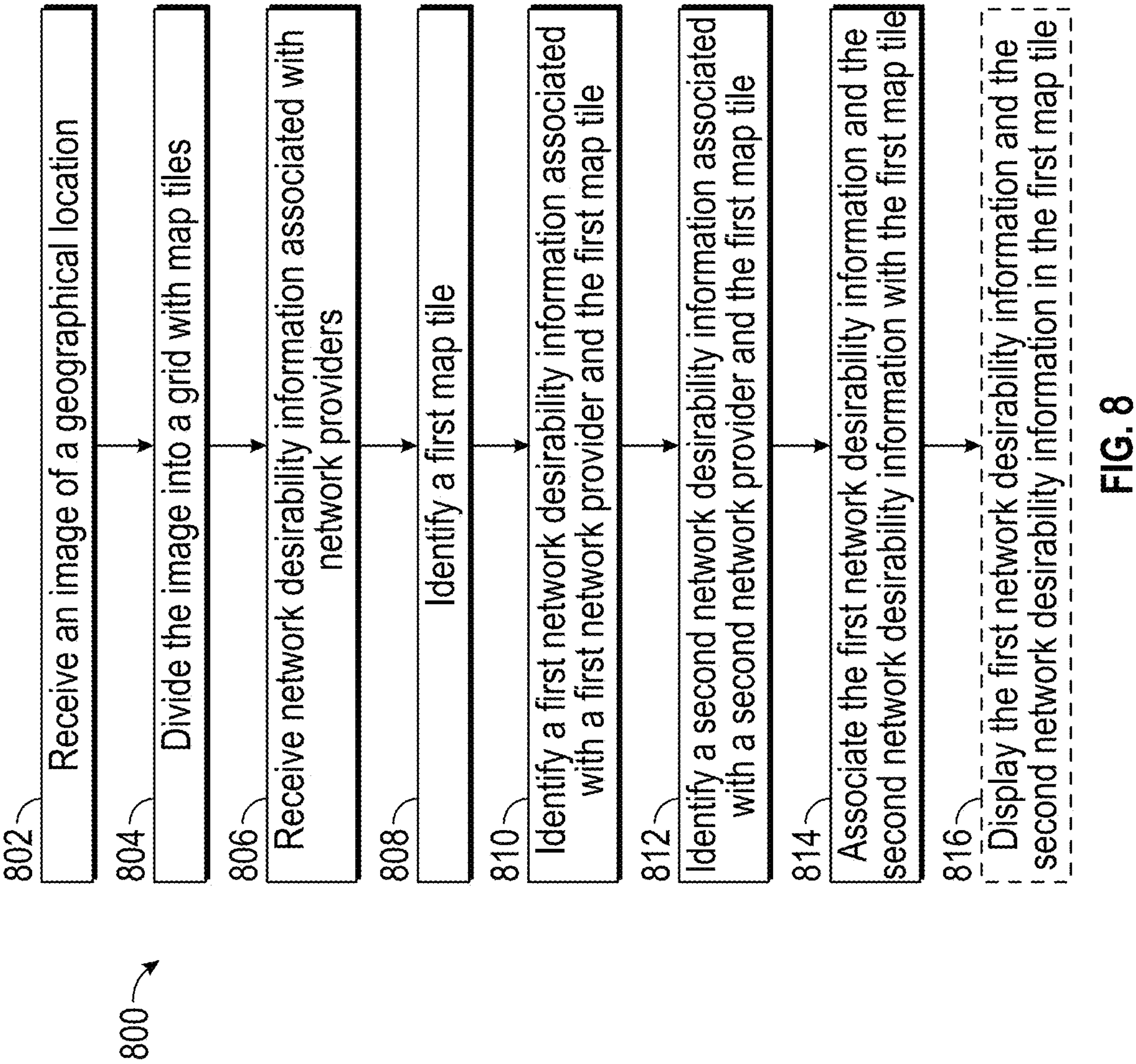
FIG. 8 illustrates an example method of generating a network provider map, according to various embodiments of the present disclosure.

FIG. 8 illustrates an example method 800 of generating a network provider map, according to various embodiments described herein.

In some embodiments, at block 802, the management server 150 optionally receives an image of a geographical location. The image can be received from the data sources 140 via the network 130, or from the location database 260 as described herein. In some embodiments, at block 804, the management server 150 optionally divides the image into a grid with map tiles. The map tiles may be associated with a geographical map or a geographical region. Each of the map tiles may be associated with a portion of the geographical map or the geographical region represented by the map tiles. The grid may be drawn to divide the image into different boundaries including, but not limited to, physical boundaries (for example, rivers, mountain ranges, oceans, lakes, deserts, canyons, and the like), city boundaries, town boundaries, country boundaries, and the like. Alternatively, the map tiles may reflect regular or semi-regular shapes, as described above.

At block 806, the management server 150 receives network desirability information associated with network providers associated with the gateway device 110 or the management server 150. A list of network providers associated with the gateway device 110 and a list of network providers associated with the management server 150 may be the same or different. In some embodiments, the network desirability information associated with network providers may be collected and gathered from one or more gateway devices 110. The network desirability information may include historical network desirability data for network providers at different geographical locations.

At block 808, the management server 150 identifies a first map tile from the image. The identification of the first map tile can include assigning each of the map tiles with a unique map tile identifier and identifying the first map tile base at least in part on the respective, corresponding unique map tile identifier.

At block 810, the management server 150 identifies a first network desirability information associated with a first network provider and the first map tile. As described herein, the management server 150 can receive the first network desirability information from the network database 264 or the data sources 140 via the network 130. The first network desirability information may include a network desirability index associated with the first network provider and the first map tile. At block 812, the management server 150 identifies a second network desirability information associated with a second network provider and the first map tile. As described herein, the management server 150 can receive the second network desirability information from the network database 264 or the data sources 140 via the network 130. The second network desirability information may include a network desirability index associated with the second network provider and the first map tile.

At block 814, the management server 150 associates the first map tile with the first network desirability information with the second network desirability information. In some embodiments, the management server 150 may be associated the first map tile with analysis of the first network desirability information and the second network desirability information. The analysis of the network desirability information may include: comparison between the first network desirability index and the second network desirability index; comparison of the first network desirability index to a first threshold; comparison of the second network desirability index to a second threshold; and the like.

At block 816, the management server 150 displays the first network desirability information and the second network desirability information in the first map tile. In some embodiments, the management server 150 may display: comparison between the first network desirability index and the second network desirability index; comparison of the first network desirability index to a first threshold; comparison of the second network desirability index to a second threshold; and the like.

List of Example Numbered Embodiments

The following is a list of example numbered embodiments. The features recited in the below list of example embodiments can be combined with additional features disclosed herein. Furthermore, additional inventive combinations of features are disclosed herein, which are not specifically recited in the below list of example embodiments and which do not include the same features as the specific embodiments listed below. For sake of brevity, the below list of example embodiments does not identify every inventive aspect of this disclosure. The below list of example embodiments are not intended to identify key features or essential features of any subject matter described herein.

1. A gateway system configured to provide network communications, the gateway system comprising:
 - a location determination device;
 - a communication module comprising a plurality of network subscription identifiers and configured to communicate with a plurality of network providers, wherein each of the plurality of network subscription identifiers is associated with a respective corresponding network provider of the plurality of network providers;
 - a computer readable storage medium having program instructions embodied therewith; and
 - one or more processors configured to execute the program instructions to cause the gateway system to:
   - determine a first location of the gateway system via the location determination device;
   - access a network provider map comprising a grid of a plurality of map tiles, wherein each of the plurality of map tiles is associated with respective network desirability information associated with each of the plurality of network providers;
   - determine, based at least in part on the first location, at least a first map tile of the plurality of map tiles;
   - identify, based at least in part on a network desirability information associated with the first map tile, a first network provider of the plurality of network providers; and
   - activate the gateway system on the first network provider using a first network subscription identifier from the plurality of network subscription identifiers, wherein the first network subscription identifier is associated with the first network provider.

2. The gateway system of Embodiment 1, wherein the first location of the gateway system is associated with a geographic region of the first map tile of the network provider map.

3. The gateway system of any of Embodiments 1 to 2, wherein the one or more processors are configured to execute the program instructions to further cause the gateway system to:
 - in response to failing to determine the first location of the gateway system:
   - determine a default network provider based at least in part on a network preference, cost information, or default setting information; and activate the gateway system on the default network provider using a default network subscription identifier from the plurality of network subscription identifiers, wherein the default network subscription identifier is associated with the default network provider.

4. The gateway system of any of Embodiments 1 to 3, wherein the network desirability information associated with the first map tile comprises:

a first network desirability information associated with the first network provider, wherein the first network desirability information satisfies a first desirability condition; and a second network desirability information associated with a second network provider of the plurality of network providers, wherein the second network desirability information does not satisfy a second desirability condition.

5. The gateway system of Embodiment 4, wherein the one or more processors are configured to execute the program instructions to further cause the gateway system to:

determine a second location of the gateway system via the location determination device;

determine, based at least in part of the second location, at least a second map tile of the plurality of map tiles; and identify a network desirability information associated with the second map tile.

6. The gateway system of Embodiment 5, wherein the one or more processors are configured to execute the program instructions to further cause the gateway system to:

maintain, based at least in part on the network desirability information associated with the second map tile, the gateway system activated on the first network provider using the first network subscription identifier; and do not activate the gateway system on the second network provider;

wherein the network desirability information associated with the second map tile comprises a first network desirability information satisfying a first desirability condition, and wherein the first network desirability information is associated with the first network provider.

7. The gateway system of Embodiment 6, wherein activation of the gateway system on the first network provider is maintained further based at least in part on and a network preference associated with the gateway system, wherein the network preference indicates which network provider of the plurality of network providers is prioritized over other network providers of the plurality of network providers.

8. The gateway system of Embodiment 7, wherein the network preference is based at least in part on the first location of the gateway system or activation of the gateway system on the first network provider.

9. The gateway system of Embodiment 5, wherein the one or more processors are configured to execute the program instructions to further cause the gateway system to:

identify, based at least in part on the network desirability information associated with the second map tile, a second network provider of the plurality of network providers; and activate the gateway system on the second network provider using a second network subscription identifier from the plurality of network subscription identifiers, wherein the second network subscription identifier is associated with the second network provider, wherein the network desirability information associated with the second map tile comprises:

a first network desirability information associated with the first network provider, wherein the first network desirability information does not satisfy a first desirability condition; and a second network desirability information associated with a second network provider of the plurality of network providers, wherein the second network desirability information satisfies a second desirability condition.

10. The gateway system of Embodiment 9, wherein the first desirability condition and the second desirability condition are not the same or similar prior to activation of the gateway system on both the first network provider and the second network provider.

11. The gateway system of any of Embodiments 9 to 10, wherein the one or more processors are configured to execute the program instructions to further cause the gateway system to:

access an updated network provider map, wherein the updated network provider map comprising a grid of a plurality of updated map tiles, and wherein each of the plurality of updated map tiles is associated with a network provider, of the plurality of network providers, having a network desirability greater than network desirability of other network providers of the plurality of network providers.

12. The gateway system of any of Embodiments 9 to 11, wherein the one or more processors are configured to execute the program instructions to further cause the gateway system to:

determine a third location of the gateway system via the location determination device;

determine, based at least in part of the third location, at least a third map tile of the plurality of map tiles;

identify a network desirability information associated with the third map tile; and enable network communications via a selected one of the first network provider or the second network provider, based at least in part on the network desirability information associated with the third map tile.

13. The gateway system of Embodiment 12, wherein the first desirability condition and the second desirability condition are the same or similar after activation of the gateway system on both the first network provider and the second network provider.

14. The gateway system of any of Embodiments 12 to 13, wherein the first desirability condition and the second desirability condition are not the same or similar after activation of the gateway system on both the first network provider and the second network provider.

15. A system for generating one or more network provider maps for assisting network handovers of gateway devices, the system comprising:

a computer readable storage medium having program instructions embodied therewith; and one or more processors configured to execute the program instructions to cause the system to:

determine a plurality of map tiles associated with a geographic map or geographic region;

receive, from a remote data server, network desirability information associated with a plurality of network providers;

for a first map tile of the plurality of map tiles:

identify a first network desirability information of the network desirability information associated with a first map tile, wherein the first network desirability information is associated with a first network provider of the plurality of network providers;

identify a second network desirability information of the network desirability information associated with the first map tile, wherein the second network desirability information is associated with a second network provider of the plurality of network providers;

compare the first network desirability information and the second network desirability information; and based at least in part on comparing the first network desirability information and the second network desirability information, associate the first map tile with the first network provider.

16. The system of Embodiment 15, wherein comparing the first network desirability information and the second network desirability information comprises at least:

determining, based at least in part on the first network desirability information, a first network desirability index;

determining, based at least in part on the second network desirability information, a second network desirability index; and determining a difference between the first network desirability indicator and the second network desirability index.

17. The system of any of Embodiments 15 to 16, wherein the network desirability information for each of the plurality of network providers is based on at least one of: data transmissibility, data transmission speed, signal strength, signal availability, signal to noise ratio, or number of dropped calls or dropped communications.

18. The system of any of Embodiments 15 to 17, wherein each of the plurality of map tiles is at least one of: a square, a quadrilateral, or another shape.

19. The system of claim 18, wherein a shape of each of the plurality of map tiles is regular.

20. The system of any of Embodiments 15 to 18, wherein shapes of each of the plurality of map tiles are irregular.

21. The system of any of Embodiments 15 to 20, wherein the one or more processors are configured to execute the program instructions to further cause the system to:

for a second map tile of the plurality of map tiles:

identify a third network desirability information of the network desirability information associated with the second map tile, wherein the third network desirability information is associated with the first network provider of the plurality of network providers;

identify a fourth network desirability information of the network desirability information associated with the second map tile, wherein the fourth network desirability information is associated with the second network provider of the plurality of network providers;

compare the third network desirability information and the fourth network desirability information; and based at least in part on comparing the third network desirability information and the fourth network desirability information, associate the second map tile with the second network provider.

Additional Implementation Details and Embodiments

Various embodiments of the present disclosure may be a system, a method, and/or a computer program product at any possible technical detail level of integration. The computer program product may include a computer readable storage medium (or mediums) having computer readable program instructions thereon for causing a processor to carry out aspects of the present disclosure.

For example, the functionality described herein may be performed as software instructions are executed by, and/or in response to software instructions being executed by, one or more hardware processors and/or any other suitable computing devices. The software instructions and/or other executable code may be read from a computer readable storage medium (or mediums).

The computer readable storage medium can be a tangible device that can retain and store data and/or instructions for use by an instruction execution device. The computer readable storage medium may be, for example, but is not limited to, an electronic storage device (including any volatile and/or non-volatile electronic storage devices), a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a solid state drive, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (for example, light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers, and/or edge servers. A network adapter card or network interface in each computing/processing device receives computer readable program instructions from the network and forwards the computer readable program instructions for storage in a computer readable storage medium within the respective computing/processing device.

Computer readable program instructions (as also referred to herein as, for example, "code," "instructions," "module," "application," "software application," and/or the like) for carrying out operations of the present disclosure may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Java, C++, or the like, and procedural programming languages, such as the "C" programming language or similar programming languages. Computer readable program instructions may be callable from other instructions or from itself, and/or may be invoked in response to detected events or interrupts. Computer readable program instructions configured for execution on computing devices may be provided on a computer readable storage medium, and/or as a digital download (and may be originally stored in a compressed or installable format that requires installation, decompression or decryption prior to execution) that may then be stored on a computer readable storage medium. Such computer readable program instructions may be stored, partially or fully, on a memory device (for example, a computer readable storage medium) of the executing computing device, for execution by the computing device. The computer readable program instructions may execute entirely on a user's computer (for example, the executing computing device), partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present disclosure.

Aspects of the present disclosure are described herein with reference to flowchart illustrations and/or block diagrams of methods, apparatus (systems), and computer program products according to embodiments of the disclosure. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart(s) and/or block diagram(s) block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks. For example, the instructions may initially be carried on a magnetic disk or solid state drive of a remote computer. The remote computer may load the instructions and/or modules into its dynamic memory and send the instructions over a telephone, cable, or optical line using a modem. A modem local to a server computing system may receive the data on the telephone/cable/optical line and use a converter device including the appropriate circuitry to place the data on a bus. The bus may carry the data to a memory, from which a processor may retrieve and execute the instructions. The instructions received by the memory may optionally be stored on a storage device (for example, a solid state drive) either before or after execution by the computer processor.

The flowchart and block diagrams in the Figures illustrate the architecture, functionality, and operation of possible implementations of systems, methods, and computer program products according to various embodiments of the present disclosure. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. In addition, certain blocks may be omitted in some implementations. The methods and processes described herein are also not limited to any particular sequence, and the blocks or states relating thereto can be performed in other sequences that are appropriate.

It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions. For example, any of the processes, methods, algorithms, elements, blocks, applications, or other functionality (or portions of functionality) described in the preceding sections may be embodied in, and/or fully or partially automated via, electronic hardware such application-specific processors (for example, application-specific integrated circuits (ASICs)), programmable processors (for example, field programmable gate arrays (FPGAs)), application-specific circuitry, and/or the like (any of which may also combine custom hard-wired logic, logic circuits, ASICs, FPGAs, etc. with custom programming/execution of software instructions to accomplish the techniques).

Any of the above-mentioned processors, and/or devices incorporating any of the above-mentioned processors, may be referred to herein as, for example, "computers," "computer devices," "computing devices," "hardware computing devices," "hardware processors," "processing units," and/or the like. Computing devices of the above-embodiments may generally (but not necessarily) be controlled and/or coordinated by operating system software, such as Mac OS, iOS, Android, Chrome OS, Windows OS (for example, Windows XP, Windows Vista, Windows 7, Windows 8, Windows 10, Windows Server, etc.), Windows CE, Unix, Linux, SunOS, Solaris, Blackberry OS, VxWorks, or other suitable operating systems. In other embodiments, the computing devices may be controlled by a proprietary operating system. Conventional operating systems control and schedule computer processes for execution, perform memory management, provide file system, networking, I/O services, and provide a user interface functionality, such as a graphical user interface ("GUI"), among other things.

As described above, in various embodiments certain functionality may be accessible by a user through a web-based viewer (such as a web browser), or other suitable software program. In such implementations, the user interface may be generated by a server computing system and transmitted to a web browser of the user (for example, running on the user's computing system). Alternatively, data (for example, user interface data) necessary for generating the user interface may be provided by the server computing system to the browser, where the user interface may be generated (for example, the user interface data may be executed by a browser accessing a web service and may be configured to render the user interfaces based on the user interface data). The user may then interact with the user interface through the web-browser. User interfaces of certain implementations may be accessible through one or more dedicated software applications. In certain embodiments, one or more of the computing devices and/or systems of the disclosure may include mobile computing devices, and user interfaces may be accessible through such mobile computing devices (for example, smartphones and/or tablets).

Many variations and modifications may be made to the above-described embodiments, the elements of which are to be understood as being among other acceptable examples. All such modifications and variations are intended to be included herein within the scope of this disclosure. The foregoing description details certain embodiments. It will be appreciated, however, that no matter how detailed the foregoing appears in text, the systems and methods can be practiced in many ways. As is also stated above, it should be noted that the use of particular terminology when describing certain features or aspects of the systems and methods should not be taken to imply that the terminology is being re-defined herein to be restricted to including any specific characteristics of the features or aspects of the systems and methods with which that terminology is associated.

Conditional language, such as, among others, "can," "could," "might," or "may," unless specifically stated otherwise, or otherwise understood within the context as used, is generally intended to convey that certain embodiments include, while other embodiments may not include, certain features, elements, and/or steps. Thus, such conditional language is not generally intended to imply that features, elements and/or steps are in any way required for one or more embodiments or that one or more embodiments necessarily include logic for deciding, with or without user input or prompting, whether these features, elements and/or steps are included or are to be performed in any particular embodiment.

The term "substantially" when used in conjunction with the term "real-time" forms a phrase that will be readily understood by a person of ordinary skill in the art. For example, it is readily understood that such language will include speeds in which no or little delay or waiting is discernible, or where such delay is sufficiently short so as not to be disruptive, irritating, or otherwise vexing to a user.

Conjunctive language such as the phrase "at least one of X, Y, and Z," or "at least one of X, Y, or Z," unless specifically stated otherwise, is to be understood with the context as used in general to convey that an item, term, etc. may be either X, Y, or Z, or a combination thereof. For example, the term "or" is used in its inclusive sense (and not in its exclusive sense) so that when used, for example, to connect a list of elements, the term "or" means one, some, or all of the elements in the list. Thus, such conjunctive language is not generally intended to imply that certain embodiments require at least one of X, at least one of Y, and at least one of Z to each be present.

The term "a" as used herein should be given an inclusive rather than exclusive interpretation. For example, unless specifically noted, the term "a" should not be understood to mean "exactly one" or "one and only one"; instead, the term "a" means "one or more" or "at least one," whether used in the claims or elsewhere in the specification and regardless of uses of quantifiers such as "at least one," "one or more," or "a plurality" elsewhere in the claims or specification.

The term "comprising" as used herein should be given an inclusive rather than exclusive interpretation. For example, a general purpose computer comprising one or more processors should not be interpreted as excluding other computer components, and may possibly include such components as memory, input/output devices, and/or network interfaces, among others.

While the above detailed description has shown, described, and pointed out novel features as applied to various embodiments, it may be understood that various omissions, substitutions, and changes in the form and details of the devices or processes illustrated may be made without departing from the spirit of the disclosure. As may be recognized, certain embodiments of the inventions described herein may be embodied within a form that does not provide all of the features and benefits set forth herein, as some features may be used or practiced separately from others. The scope of certain inventions disclosed herein is indicated by the appended claims rather than by the foregoing description. All changes which come within the meaning and range of equivalency of the claims are to be embraced within their scope.

What is claimed is:

1. An gateway system configured to provide network communications, the gateway system comprising:

- a location determination device;
- a communication module comprising a plurality of network subscription identifiers and configured to communicate with a plurality of network providers, wherein each of the plurality of network subscription identifiers is associated with a respective corresponding network provider of the plurality of network providers;
- a computer readable storage medium having program instructions embodied therewith; and
- one or more processors configured to execute the program instructions to cause the gateway system to:
  - determine a first location of the gateway system via the location determination device;
  - access a network provider map comprising a grid of a plurality of map tiles, wherein each of the plurality of map tiles is associated with respective network desirability information associated with each of the plurality of network providers;
  - determine, based at least in part on the first location, at least a first map tile of the plurality of map tiles;
  - identify, based at least in part on a network desirability information associated with the first map tile, a first network provider of the plurality of network providers; and
  - activate the gateway system on the first network provider using a first network subscription identifier from the plurality of network subscription identifiers, wherein the first network subscription identifier is associated with the first network provider.

2. The gateway system of claim 1, wherein the first location of the gateway system is associated with a geographic region of the first map tile of the network provider map.

3. The gateway system of claim 1, wherein the one or more processors are configured to execute the program instructions to further cause the gateway system to:

in response to failing to determine the first location of the gateway system:

determine a default network provider based at least in part on a network preference, cost information, or default setting information; and activate the gateway system on the default network provider using a default network subscription identifier from the plurality of network subscription identifiers, wherein the default network subscription identifier is associated with the default network provider.

4. The gateway system of claim 1, wherein the network desirability information associated with the first map tile comprises:

a first network desirability information associated with the first network provider, wherein the first network desirability information satisfies a first desirability condition; and a second network desirability information associated with a second network provider of the plurality of network providers, wherein the second network desirability information does not satisfy a second desirability condition.

5. The gateway system of claim 4, wherein the one or more processors are configured to execute the program instructions to further cause the gateway system to:

determine a second location of the gateway system via the location determination device;

determine, based at least in part of the second location, at least a second map tile of the plurality of map tiles; and identify a network desirability information associated with the second map tile.

6. The gateway system of claim 5, wherein the one or more processors are configured to execute the program instructions to further cause the gateway system to:

maintain, based at least in part on the network desirability information associated with the second map tile, the gateway system activated on the first network provider using the first network subscription identifier; and do not activate the gateway system on the second network provider;

wherein the network desirability information associated with the second map tile comprises a first network desirability information satisfying a first desirability condition, and wherein the first network desirability information is associated with the first network provider.

7. The gateway system of claim 6, wherein activation of the gateway system on the first network provider is maintained further based at least in part on and a network preference associated with the gateway system, wherein the network preference indicates which network provider of the plurality of network providers is prioritized over other network providers of the plurality of network providers.

8. The gateway system of claim 7, wherein the network preference is based at least in part on the first location of the gateway system or activation of the gateway system on the first network provider.

9. The gateway system of claim 5, wherein the one or more processors are configured to execute the program instructions to further cause the gateway system to:

identify, based at least in part on the network desirability information associated with the second map tile, a second network provider of the plurality of network providers; and activate the gateway system on the second network provider using a second network subscription identifier from the plurality of network subscription identifiers, wherein the second network subscription identifier is associated with the second network provider, wherein the network desirability information associated with the second map tile comprises:

a first network desirability information associated with the first network provider, wherein the first network desirability information does not satisfy a first desirability condition; and a second network desirability information associated with a second network provider of the plurality of network providers, wherein the second network desirability information satisfies a second desirability condition.

10. The gateway system of claim 9, wherein the first desirability condition and the second desirability condition are not the same or similar prior to activation of the gateway system on both the first network provider and the second network provider.

11. The gateway system of claim 9, wherein the one or more processors are configured to execute the program instructions to further cause the gateway system to:

access an updated network provider map, wherein the updated network provider map comprising a grid of a plurality of updated map tiles, and wherein each of the plurality of updated map tiles is associated with a network provider, of the plurality of network providers, having a network desirability greater than network desirability of other network providers of the plurality of network providers.

12. The gateway system of claim 9, wherein the one or more processors are configured to execute the program instructions to further cause the gateway system to:

determine a third location of the gateway system via the location determination device;

determine, based at least in part of the third location, at least a third map tile of the plurality of map tiles;

identify a network desirability information associated with the third map tile; and enable network communications via a selected one of the first network provider or the second network provider, based at least in part on the network desirability information associated with the third map tile.

13. The gateway system of claim 12, wherein the first desirability condition and the second desirability condition are the same or similar after activation of the gateway system on both the first network provider and the second network provider.

14. The gateway system of claim 12, wherein the first desirability condition and the second desirability condition are not the same or similar after activation of the gateway system on both the first network provider and the second network provider.

15. A system for generating one or more network provider maps for assisting network handovers of gateway devices, the system comprising:

a computer readable storage medium having program instructions embodied therewith; and one or more processors configured to execute the program instructions to cause the system to:

determine a plurality of map tiles associated with a geographic map or geographic region;

receive, from a remote data server, network desirability information associated with a plurality of network providers;

for a first map tile of the plurality of map tiles:

identify a first network desirability information of the network desirability information associated with a first map tile, wherein the first network desirability information is associated with a first network provider of the plurality of network providers;

identify a second network desirability information of the network desirability information associated with the first map tile, wherein the second network desirability information is associated with a second network provider of the plurality of network providers;

compare the first network desirability information and the second network desirability information; and based at least in part on comparing the first network desirability information and the second network desirability information, associate the first map tile with the first network provider.

16. The system of claim 15, wherein comparing the first network desirability information and the second network desirability information comprises at least:

determining, based at least in part on the first network desirability information, a first network desirability index;

determining, based at least in part on the second network desirability information, a second network desirability index; and determining a difference between the first network desirability index and the second network desirability index.

17. The system of claim 15, wherein the network desirability information for each of the plurality of network providers is based on at least one of: data transmissibility, data transmission speed, signal strength, signal availability, signal to noise ratio, or number of dropped calls or dropped communications.

18. The system of claim 15, wherein each of the plurality of map tiles is at least one of: a square, a quadrilateral, or another shape.

19. The system of claim 18, wherein shapes of each of the plurality of map tiles are at least one of: regular or irregular.

20. The system of claim 15, wherein the one or more processors are configured to execute the program instructions to further cause the system to:

for a second map tile of the plurality of map tiles:

identify a third network desirability information of the network desirability information associated with the second map tile, wherein the third network desirability information is associated with the first network provider of the plurality of network providers;

identify a fourth network desirability information of the network desirability information associated with the second map tile, wherein the fourth network desirability information is associated with the second network provider of the plurality of network providers;

compare the third network desirability information and the fourth network desirability information; and based at least in part on comparing the third network desirability information and the fourth network desirability information, associate the second map tile with the second network provider.

* * * * *